US012781665B2

(12) United States Patent
Sibbach et al.

(10) Patent No.: US 12,781,665 B2
(45) Date of Patent: Nov. 3, 2026

(54) TURBINE ENGINE HAVING A VARIABLE ENGINE INTAKE SYSTEM

(71) Applicant: General Electric Company, Evendale, OH (US)

(72) Inventors: Arthur W. Sibbach, Boxford, MA (US); Brandon W. Miller, Middletown, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 19/346,943

(22) Filed: Oct. 1, 2025

(65) Prior Publication Data

US 2026/0098496 A1 Apr. 9, 2026

Related U.S. Application Data

(62) Division of application No. 18/910,933, filed on Oct. 9, 2024, now Pat. No. 12,435,666.

(51) Int. Cl.
*F02C 7/042* (2006.01)

(52) U.S. Cl.
CPC .......... *F02C 7/042* (2013.01); *F05D 2220/36* (2013.01)

(58) Field of Classification Search
CPC ...... F02C 7/042; F02C 7/057; F05D 2220/36; F05D 2250/90
See application file for complete search history.

(56) References Cited

U.S. PATENT DOCUMENTS

| | | | | |
|---|---|---|---|---|
| 2,948,111 | A | 8/1960 | Nelson | |
| 3,176,462 | A | 4/1965 | Eckert | |
| 3,285,003 | A | 11/1966 | Erhard et al. | |
| 3,664,612 | A | 5/1972 | Skidmore et al. | |
| 3,763,874 | A | 10/1973 | Light et al. | |
| 4,132,240 | A | 1/1979 | Frantz | |
| 4,620,679 | A | 11/1986 | Karanian | |
| 5,014,933 | A * | 5/1991 | Harm | B64D 33/02 181/220 |
| 5,058,617 | A | 10/1991 | Stockman et al. | |
| 7,870,721 | B2 | 1/2011 | Winter et al. | |
| 8,181,905 | B2 * | 5/2012 | McDonough | B64D 29/00 244/129.4 |
| 8,192,147 | B2 | 6/2012 | Haas | |

(Continued)

FOREIGN PATENT DOCUMENTS

| | | | |
|---|---|---|---|
| CN | 116378827 | A | 7/2023 |
| EP | 0241404 | B1 | 6/1991 |

(Continued)

*Primary Examiner* — Brian P Wolcott
(74) *Attorney, Agent, or Firm* — Venable LLP; Duarte Y Ho; Michele V. Frank

(57) ABSTRACT

A turbine engine including a fan having a plurality of fan blades, a nacelle that extends circumferentially about the fan, an engine intake including an engine inlet, and a variable engine intake system. The nacelle includes a fan cowl and an inlet cowl that is movable with respect to the fan cowl. The engine inlet is defined from a leading edge of the nacelle to the plurality of fan blades. The variable engine intake system adjusts the inlet cowl axially between a fully retracted position and a fully extended position to adjust an inlet length of the engine inlet. The inlet cowl maintains contact with the fan cowl when the inlet cowl is extended.

20 Claims, 23 Drawing Sheets

(56) References Cited

U.S. PATENT DOCUMENTS

| | | | | |
|---|---|---|---|---|
| 8,205,430 | B2 | 6/2012 | Jain | |
| 8,544,793 | B1 | 10/2013 | Shammoh | |
| 8,613,398 | B2 * | 12/2013 | Calder | F02K 1/383 239/265.19 |
| 8,727,267 | B2 * | 5/2014 | Jain | F02K 3/06 244/53 B |
| 9,004,399 | B2 | 4/2015 | Jain | |
| 9,169,779 | B2 | 10/2015 | Winter et al. | |
| 9,228,534 | B2 * | 1/2016 | Jain | B64D 33/02 |
| 9,719,421 | B2 * | 8/2017 | Todorovic | B64D 29/00 |
| 9,920,653 | B2 | 3/2018 | Lord et al. | |
| 9,932,121 | B2 | 4/2018 | Morford | |
| 9,932,933 | B2 | 4/2018 | Lord et al. | |
| 9,951,719 | B2 | 4/2018 | Sawyers-Abbott | |
| 10,107,196 | B2 | 10/2018 | Devine et al. | |
| 10,221,764 | B2 * | 3/2019 | Labrecque | F02C 7/045 |
| 10,301,971 | B2 | 5/2019 | Lord et al. | |
| 10,371,094 | B2 | 8/2019 | Rolt | |
| 10,399,687 | B2 | 9/2019 | Kawai et al. | |
| 10,724,541 | B2 | 7/2020 | Qiu et al. | |
| 10,815,886 | B2 | 10/2020 | Kroger et al. | |
| 10,830,136 | B2 | 11/2020 | Stuart | |
| 11,066,993 | B2 | 7/2021 | Labrecque et al. | |
| 11,149,637 | B2 | 10/2021 | Todorovic | |
| 11,390,393 | B2 | 7/2022 | Cochran | |
| 11,441,482 | B2 | 9/2022 | Lacko | |
| 11,486,307 | B2 | 11/2022 | Hudson | |
| 11,542,866 | B2 | 1/2023 | Rafferty et al. | |
| 11,661,887 | B2 | 5/2023 | Labrecque et al. | |
| 11,767,124 | B2 | 9/2023 | Alonso-Miralles | |
| 11,808,281 | B2 | 11/2023 | Miller et al. | |
| 11,913,378 | B2 * | 2/2024 | Tantot | F02C 7/04 |
| 12,214,893 | B2 * | 2/2025 | Kioua | F01D 17/00 |
| 2008/0308684 | A1 | 12/2008 | Chaudhry | |
| 2008/0310956 | A1 * | 12/2008 | Jain | B64D 33/02 415/200 |
| 2009/0008508 | A1 | 1/2009 | Jain et al. | |
| 2009/0092482 | A1 | 4/2009 | Winter | |
| 2010/0019100 | A1 | 1/2010 | Smith et al. | |
| 2016/0040595 | A1 | 2/2016 | Devine | |
| 2016/0305321 | A1 | 10/2016 | Pujar et al. | |
| 2018/0057184 | A1 | 3/2018 | Jackowski et al. | |
| 2021/0332764 | A1 | 10/2021 | Saripella et al. | |

FOREIGN PATENT DOCUMENTS

| | | | |
|---|---|---|---|
| EP | 3878736 | B1 | 11/2022 |
| FR | 3127269 | A1 | 3/2023 |
| FR | 3130896 | A1 | 6/2023 |
| FR | 3130897 | A1 | 6/2023 |
| FR | 3133367 | A1 | 9/2023 |
| FR | 3133368 | A1 | 9/2023 |
| WO | 2023175271 | A1 | 9/2023 |

* cited by examiner

TURBINE ENGINE HAVING A VARIABLE ENGINE INTAKE SYSTEM

CROSS REFERENCE TO RELATED APPLICATIONS

This application is a divisional of U.S. patent application Ser. No. 18/910,933 filed on Oct. 9, 2024, the contents of which are hereby incorporated by reference in their entirety.

TECHNICAL FIELD

The present disclosure relates generally to a turbine engine having a variable engine intake system.

BACKGROUND

Turbine engines, for example, for aircraft, generally include a fan and a core section arranged in flow communication with one another. The turbine engines include an engine intake at which air enters the turbine engines and passes through the fan.

BRIEF DESCRIPTION OF THE DRAWINGS

Features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Figure 1A:
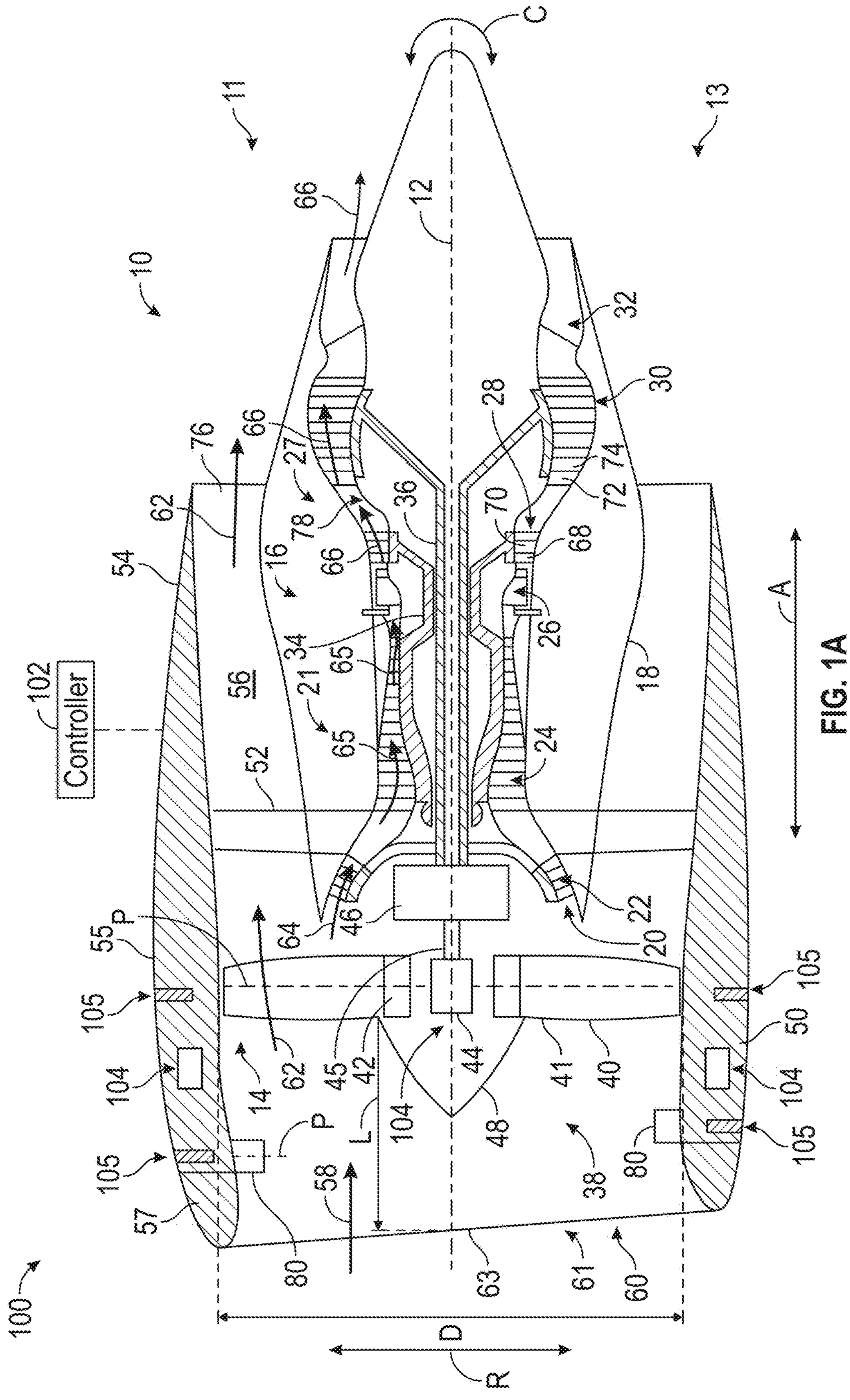
FIG. 1A is a schematic cross-sectional diagram of a turbine engine, taken along a longitudinal centerline axis of the turbine engine, according to the present disclosure.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments of the present disclosure are discussed in detail below. While specific embodiments are discussed, this is done for illustration purposes only. A person skilled in the relevant art will recognize that other components and configurations may be used without departing from the present disclosure.

As used herein, the terms "first," "second," etc., may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "forward" and "aft" refer to relative positions within a turbine engine or vehicle, and refer to the normal operational attitude of the turbine engine or vehicle. For example, with regard to a turbine engine, forward refers to a position on the turbine engine that is closer to the propeller or the fan and aft refers to a position on the turbine engine that is further away from the propeller or the fan. When the turbine engine is configured in a pusher configuration, the propeller or the fan is positioned on an aft side of the turbine engine such that forward refers to a position that is further away from the propeller or the fan and aft refers to a position that is closer to the propeller or the fan.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

As used herein, "top" refers to a highest or uppermost point, portion, or surface of a component in the orientations shown in the figures.

As used herein, "bottom" refers to a lowest or lowermost point, portion, or surface of a component in the orientations shown in the figures.

As used herein, "crosswind" or "crosswind conditions" means any wind that has an orthogonal component to a longitudinal centerline axis of a turbine engine in a direction of travel of an aircraft on which the turbine engine is mounted. The crosswind includes a horizontal component with respect to the orientation of the turbine engine in FIGS. 1A and 1B, and can include both a vertical component and a horizontal component.

As used herein, "wind shear" or "wind shear conditions" means any wind that has a vertical component to the longitudinal centerline axis of the turbine engine. Wind shear is a wind direction or wind speed change in a vertical direction (e.g., a change in altitude) with respect to the longitudinal centerline axis of the turbine engine.

As used herein, an "engine intake" is a portion of the turbine engine in which air enters the turbine engine and extends to a core inlet of the turbine engine. The engine intake includes an engine inlet of a nacelle of the turbine engine (in a ducted turbine engine) and includes a fan section of the turbine engine.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

The singular forms "a," "an," and "the" include plural references unless the context clearly dictates otherwise.

As used herein, a "turbo-engine" includes a compressor section, a combustion section, and a turbine section.

Approximating language, as used herein throughout the specification and claims, is applied to modify any quantitative representation that could permissibly vary without resulting in a change in the basic function to which it is related. Accordingly, a value modified by a term or terms, such as "about," "approximately," "generally," and "substantially" is not to be limited to the precise value specified. In at least some instances, the approximating language may correspond to the precision of an instrument for measuring the value, or the precision of the methods or the machines for constructing the components and/or the systems or manufacturing the components and/or the systems. For example, the approximating language may refer to being within a one percent margin, a two percent margin, a four percent margin, a ten percent margin, a fifteen percent margin, or a twenty percent margin in either individual values, range(s) of values and/or endpoints defining range(s) of values.

Here and throughout the specification and claims, range limitations are combined, and interchanged. Such ranges are identified and include all the sub-ranges contained therein unless context or language indicates otherwise. For example, all ranges disclosed herein are inclusive of the endpoints, and the endpoints are independently combinable with each other.

The present disclosure is directed to a turbine engine (e.g., for an aircraft) having a fan with a plurality of fan blades. Wind conditions, such as, for example, crosswind, wind shear, or the like, during takeoff and landing can lead to separation of the air stream from the engine intake, and, thus, the separated air stream enters the fan, resulting in reduced performance of the turbine engine. Existing engine intakes typically are axially long to minimize distortion of the air before the air enters the fan. Minimizing the axial length of the engine intake, and, thus, the turbine engine, reduces an amount of drag of the turbine engine. However, minimizing the axial length of the engine intake can affect the performance and the efficiency of the turbine engine due to the wind conditions (e.g., crosswind, wind shear, etc.).

Accordingly, the present disclosure provides for a turbine engine having a variable engine intake system. The variable engine intake system can detect the wind conditions and adjust the engine intake based on the wind conditions to mitigate the wind conditions. In particular, mitigating the wind conditions includes adjusting the engine intake to minimize air flow detachment from the fan blades (e.g., to prevent the fan from stalling). The variable engine intake system includes a plurality of sensors to sense information indicative of the wind conditions, and determines the wind conditions based on a comparison of sensors on opposite sides of the turbine engine. The variable engine intake system determines that there is crosswind or wind shear if the information from the sensors on opposite sides of the turbine engine is different (e.g., not equal). The variable engine intake system then adjusts the engine intake to mitigate the crosswind or the wind shear. For example, the variable engine intake system can adjust the pitch of the fan blades, the speed of the fan, the pitch of inlet guide vanes, a length of the engine intake, a droop angle of the engine intake, or a diameter of the engine intake. The sensors can be located on the turbine engine or can be located on the aircraft. The engine intake can also include anti-ice features that are either electrical or pneumatic to heat the engine intake. Accordingly, the variable engine intake system provides an improved system for mitigating wind conditions about the turbine engine while also allowing for a shorter engine intake to reduce drag during normal operation, as compared to turbine engines without the benefit of the present disclosure.

Opposite side pressure sensors can detect a pressure difference of a crosswind as the crosswind begins to affect a trajectory of the aircraft, rather than waiting for a navigation system to identify that the aircraft has moved offtrack, or to identify that a pilot has adjusted a flight control surface to counter the effect of the crosswind on the aircraft trajectory. When a crosswind is detected, the variable engine intake system adjusts the engine intake (e.g., extends the engine intake) to minimize or otherwise reduce an effect on the air entering the fan (e.g., minimize the air from separating from the engine intake), while maintaining a shorter engine intake length throughout most of a flight to minimize, or otherwise reduce, drag, and, thus, maximize, or otherwise improve, fuel efficiency. Crosswinds have the greatest impact in near static conditions (e.g., low forward speed), such as, for example, during a take-off phase or a landing phase of a flight cycle. Therefore, the variable engine intake system adjusts the engine intake based on a ground proximity (e.g., less than 5,000 feet). Once the aircraft is moving fast enough, the effects of a crosswind are minimized by the forward speed of the aircraft.

Referring now to the drawings, FIG. 1A is a schematic cross-sectional diagram of a turbine engine 10, taken along a longitudinal centerline axis 12 of the turbine engine 10, according to the present disclosure. As shown in FIG. 1, the turbine engine 10 defines an axial direction A (extending parallel to the longitudinal centerline axis 12 provided for reference), a radial direction R that is normal to the axial direction A, and a circumferential direction C that extends arcuately about the longitudinal centerline axis 12. In general, the turbine engine 10 includes a fan section 14 and a turbo-engine 16 disposed downstream from the fan section 14.

The turbo-engine 16 includes, in serial flow relationship, a compressor section 21, a combustion section 26, and a turbine section 27. The turbo-engine 16 is substantially enclosed within an outer casing 18 that is substantially tubular and defines a core inlet 20 that is annular about the longitudinal centerline axis 12. As schematically shown in FIG. 1, the compressor section 21 includes a booster or a low pressure (LP) compressor 22 followed downstream by a high pressure (HP) compressor 24. The combustion section 26 is downstream of the compressor section 21. The turbine section 27 is downstream of the combustion section 26 and includes a high pressure (HP) turbine 28 followed downstream by a low pressure (LP) turbine 30. The turbo-engine 16 further includes a jet exhaust nozzle section 32 that is downstream of the turbine section 27, a high-pressure (HP) shaft 34 or a spool, and a low-pressure (LP) shaft 36. The HP shaft 34 drivingly connects the HP turbine 28 to the HP compressor 24. The HP turbine 28 and the HP compressor 24 rotate in unison through the HP shaft 34. The LP shaft 36 drivingly connects the LP turbine 30 to the LP compressor 22. The LP turbine 30 and the LP compressor 22 rotate in unison through the LP shaft 36. The compressor section 21, the combustion section 26, the turbine section 27, and the jet exhaust nozzle section 32 together define a core air flow path.

For the embodiment depicted in FIG. 1, the fan section 14 includes a fan 38 (e.g., a variable pitch fan) having a plurality of fan blades 40 coupled to a disk 42 in a spaced apart manner. As depicted in FIG. 1, the fan blades 40 extend outwardly from the disk 42 generally along the radial direction R. In the case of a variable pitch fan, the plurality of fan blades 40 is rotatable relative to the disk 42 about a pitch axis P by virtue of the fan blades 40 being operatively coupled to an actuator 44 configured to collectively vary the pitch of the fan blades 40 in unison. The fan blades 40, the disk 42, and the actuator 44 are together rotatable about the longitudinal centerline axis 12 via a fan shaft 45 that is powered by the LP shaft 36 across a power gearbox, also referred to as a gearbox assembly 46. In this way, the fan 38 is drivingly coupled to, and powered by, the turbo-engine 16, and the turbine engine 10 is an indirect drive engine. The gearbox assembly 46 is shown schematically in FIG. 1. The gearbox assembly 46 is a reduction gearbox assembly for adjusting the rotational speed of the fan shaft 45 and, thus, the fan 38 relative to the LP shaft 36 when power is transferred from the LP shaft 36 to the fan shaft 45.

Referring still to the exemplary embodiment of FIG. 1, the disk 42 is covered by a fan hub 48 that is aerodynamically contoured to promote an airflow through the plurality of fan blades 40. In addition, the fan section 14 includes an annular fan casing or a nacelle 50 that circumferentially surrounds the fan 38 and at least a portion of the turbo-engine 16. The nacelle 50 is supported relative to the turbo-engine 16 by a plurality of outlet guide vanes 52 that is circumferentially spaced about the nacelle 50 and the turbo-engine 16. Moreover, a downstream section 54 of the nacelle 50 extends over an outer portion of the turbo-engine 16, and, with the outer casing 18, defines a bypass airflow passage 56 therebetween. The turbine engine 10 includes an engine intake 60. The engine intake 60 includes an engine inlet 61 of the nacelle 50 and the fan section 14, such that the engine intake 60 is defined by the engine inlet 61 of the nacelle 50 and the fan section 14. In particular, the engine intake 60 extends from a leading edge 63 of the nacelle 50 to the core inlet 20. The engine inlet 61 extends from the leading edge 63 of the nacelle 50 to a leading edge 41 of the fan blades 40. The nacelle 50 includes a fan cowl 55 and an inlet cowl 57. The inlet cowl 57 is positioned at the forward end of the nacelle 50 and defines at least a portion of the engine intake 60, and the fan cowl 55 is positioned aft of the inlet cowl 57. In this way, the inlet cowl 57 defines the leading edge 63 of the engine inlet 61 (e.g., of the nacelle 50). The fan cowl 55 is stationary and the inlet cowl 57 can move with respect to the fan cowl 55, as detailed further below.

The engine inlet 61 of the turbine engine 10 has an inlet length L and an inlet diameter D. The inlet length L is an axial length (in the axial direction A) from the leading edge 41 of the fan blades 40 to the leading edge 63 of the nacelle 50. In particular, the inlet length L is measured from the leading edge 41 of the fan blades 40 at an intersection of the fan blades 40 with the fan hub 48 to the leading edge 63 (e.g., the inlet cowl 57) of the turbine engine 10. The inlet diameter D is a diameter of the fan 38 at a tip of the fan blades 40 at the leading edge 41 of the fan blades 40. A ratio of the inlet length L to the inlet diameter D (L/D) is in a range of 0.3 to 1.0.

During operation of the turbine engine 10, a volume of air, also referred to as inlet air 58, enters the turbine engine 10 through the engine inlet 61 of the engine intake 60. As the inlet air 58 passes across the fan blades 40, a first portion of air, also referred to as bypass air 62 is routed into the bypass airflow passage 56, and a second portion of air, also referred to as core air 64, is routed into the upstream section of the core air flow path through the core inlet 20 of the LP compressor 22. The pressure of the core air 64 is then increased, generating compressed air 65. The compressed air 65 is routed through the HP compressor 24 and into the combustion section 26, where the compressed air 65 is mixed with fuel and ignited to generate combustion gases 66.

The combustion gases 66 are routed into the HP turbine 28 and expanded through the HP turbine 28 where a portion of thermal energy or kinetic energy from the combustion gases 66 is extracted via one or more stages of HP turbine stator vanes 68 and HP turbine rotor blades 70 that are coupled to the HP shaft 34. This causes the HP shaft 34 to rotate, thereby supporting operation of the HP compressor 24 (self-sustaining cycle). In this way, the combustion gases 66 do work on the HP turbine 28. The combustion gases 66 are then routed into the LP turbine 30 and expanded through the LP turbine 30. Here, a second portion of the thermal energy or the kinetic energy is extracted from the combustion gases 66 via one or more stages of LP turbine stator vanes 72 and LP turbine rotor blades 74 that are coupled to the LP shaft 36. This causes the LP shaft 36 to rotate, thereby supporting operation of the LP compressor 22 (self-sustaining cycle) and rotation of the fan 38 via the gearbox assembly 46. In this way, the combustion gases 66 do work on the LP turbine 30.

The combustion gases 66 are subsequently routed through the jet exhaust nozzle section 32 of the turbo-engine 16 to provide propulsive thrust. Simultaneously, the bypass air 62 is routed through the bypass airflow passage 56 before being exhausted from a fan nozzle exhaust section 76 of the turbine engine 10, also providing propulsive thrust. The HP turbine 28, the LP turbine 30, and the jet exhaust nozzle section 32 at least partially define a hot gas path 78 for routing the combustion gases 66 through the turbo-engine 16.

The turbine engine 10 also includes a plurality of inlet guide vanes 80 positioned upstream of the plurality of fan blades 40 of the fan 38 and attached to, or integrated into, the nacelle 50. Each of the plurality of inlet guide vanes 80 is a part span inlet guide vane such that each of the plurality of inlet guide vanes 80 does not extend completely between the nacelle 50 and the fan hub 48. In particular, an inlet guide vane span of each of the plurality of inlet guide vanes 80 is less than a fan blade span of each of the plurality of fan blades 40 in the radial direction R. The plurality of inlet guide vanes 80 pre-swirls the inlet air 58 after the inlet air 58 passes through the engine inlet 61 and upstream of the plurality of fan blades 40. Pre-swirling the inlet air 58 helps to reduce separation losses or shock losses on the plurality of fan blades 40, allowing the fan 38 to operate with a relatively high fan tip speed with less losses in efficiency as compared to turbine engines without the benefit of the present disclosure. In some embodiments, the plurality of inlet guide vanes 80 can include a same number of inlet guide vanes 80 as a number of the plurality of fan blades 40. The plurality of inlet guide vanes 80 can include any number of inlet guide vanes for pre-swirling the inlet air 58, as desired.

Each of the plurality of inlet guide vanes 80 is a variable pitch inlet guide vane. In the case of a variable pitch inlet guide vane, each of the plurality of inlet guide vanes 80 is rotatable relative to the nacelle 50 about a pitch axis P by virtue of the inlet guide vanes 80 being operatively coupled to an actuation member configured to collectively vary the pitch of the inlet guide vanes 80 in unison.

The turbine engine 10 depicted in FIG. 1A is by way of example only. In other exemplary embodiments, the turbine engine may have any other suitable configuration. For example, in other exemplary embodiments, the fan 38 may be configured in any other suitable manner (e.g., as a fixed pitch fan) and further may be supported using any other suitable fan frame configuration. The turbine engine 10 may also be a direct drive engine, which does not have a power gearbox. The fan speed is the same as the LP shaft speed for a direct drive engine. Moreover, in other exemplary embodiments, any other suitable number or configuration of compressors, turbines, shafts, or a combination thereof may be provided. In still other exemplary embodiments, aspects of the present disclosure may be incorporated into any other suitable turbine engine, such as, for example, turbofan engines or turbojet engines. The turbofan engines can be configured in a puller configuration (e.g., the fan section 14 at the forward end of the turbine engine 10) or in a pusher configuration (e.g., the fan section 14 at the aft end of the turbine engine 10).

The turbine engine 10 includes a variable engine intake system 100 for adjusting a configuration of the engine intake 60. In particular, the variable engine intake system 100 adjusts the configuration of the engine intake 60 based on wind conditions on the turbine engine 10, as detailed further below. The variable engine intake system 100 includes a controller 102, one or more actuators 104, and a plurality of wind condition sensors 105. In this way, the variable engine intake system 100 includes the engine intake 60, via the one or more actuators 104, including the fan blades 40, the inlet cowl 57, and the inlet guide vanes 80.

The controller 102 is in communication with the turbine engine 10 for controlling aspects of the turbine engine 10. For example, the controller 102 is in two-way communication with the turbine engine 10 for receiving signals from various sensors (e.g., the wind condition sensors 105) and control systems of the turbine engine 10 and for controlling components of the turbine engine 10, as detailed further below. The controller 102, or components thereof, may be located onboard the turbine engine 10, onboard the aircraft, or can be located remote from each of the turbine engine 10 and the aircraft. The controller 102 can be a Full Authority Digital Engine Control (FADEC) that controls aspects of the turbine engine 10.

The controller 102 may be a standalone controller or may be part of an engine controller to operate various systems of the turbine engine 10. In this embodiment, the controller 102 is a computing device having one or more processors and a memory. The one or more processors can be any suitable processing device, including, but not limited to, a microprocessor, a microcontroller, an integrated circuit, a logic device, a programmable logic controller (PLC), an application specific integrated circuit (ASIC), or a Field Programmable Gate Array (FPGA). The memory can include one or more computer-readable media, including, but not limited to, non-transitory computer-readable media, a computer readable non-volatile medium (e.g., a flash memory), a RAM, a ROM, hard drives, flash drives, or other memory devices.

The memory can store information accessible by the one or more processors, including computer-readable instructions that can be executed by the one or more processors. The instructions can be any set of instructions or a sequence of instructions that, when executed by the one or more processors, cause the one or more processors and the controller 102 to perform operations. The controller 102 and, more specifically, the one or more processors are programmed or configured to perform these operations, such as the operations discussed further below. In some embodiments, the instructions can be executed by the one or more processors to cause the one or more processors to complete any of the operations and functions for which the controller 102 is configured, as will be described further below. The instructions can be software written in any suitable programming language or can be implemented in hardware. Additionally, or alternatively, the instructions can be executed in logically or virtually separate threads on the processors. The memory can further store data that can be accessed by the one or more processors.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The one or more actuators 104 include actuators for adjusting at least one of the pitch of the plurality of fan blades 40 (e.g., the actuator 44), the pitch of the plurality of inlet guide vanes 80, or a position of the inlet cowl 57. In particular, the controller 102 can control the one or more actuators 104 to adjust at least one of the pitch of the plurality of fan blades 40, the pitch of the plurality of inlet guide vanes 80, or the position of the inlet cowl 57, as detailed further below. The position of the inlet cowl 57 can include an axial position (as detailed below with respect to FIGS. 5A to 8B, a droop angle of the inlet cowl 57 (as detailed below with respect to FIGS. 10A to 11B), or a diameter of the inlet cowl 57 (as detailed below with respect to FIGS. 12A to 13F).

The plurality of wind condition sensors 105 includes pressure sensors that sense a static pressure of ambient air about the turbine engine 10. The controller 102 is in communication with the plurality of wind condition sensors 105 to receive the sensed static pressure and determines wind conditions based on the static pressure. For example, the controller 102 can determine crosswind conditions or wind shear conditions based on the static pressure sensed by the plurality of wind condition sensors 105, as detailed further below. In some embodiments, the plurality of wind condition sensors 105 includes anemometers that sense and measure wind speed and wind direction. In some embodiments, the plurality of wind condition sensors 105 includes vibration sensors for detecting vibration of the turbine engine 10 due to, for example, fan blade flutter of the fan blades 40 as the inlet air 58 passes through the fan 38.

The plurality of wind condition sensors 105 is positioned about the nacelle 50 to sense the wind conditions about the turbine engine 10. As shown in FIG. 1A, the plurality of wind condition sensors 105 includes a plurality of wind condition sensors axially aligned with the fan 38. The plurality of wind condition sensors 105 can also include a plurality of wind condition sensors positioned axially forward of the fan 38, for example, at a forward portion of the engine intake 60. In this way, the plurality of wind condition sensors 105 includes at least one of a plurality of wind condition sensors axially aligned with the fan 38 or a plurality of wind condition sensors at the forward portion of the engine intake 60.

Figure 1B:
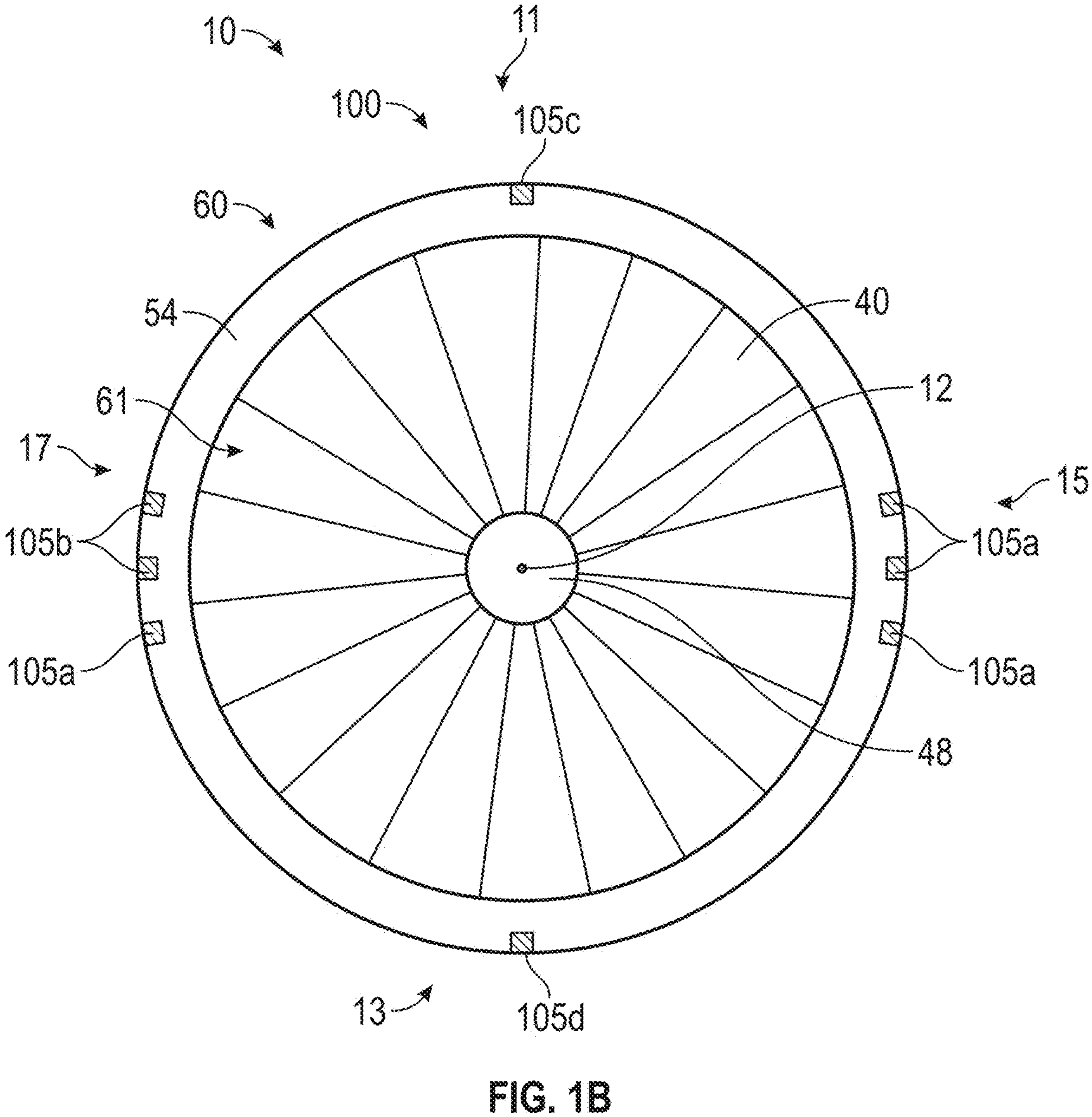
FIG. 1B is a schematic front view of the turbine engine of FIG. 1A, according to the present disclosure.
Figure 1C:
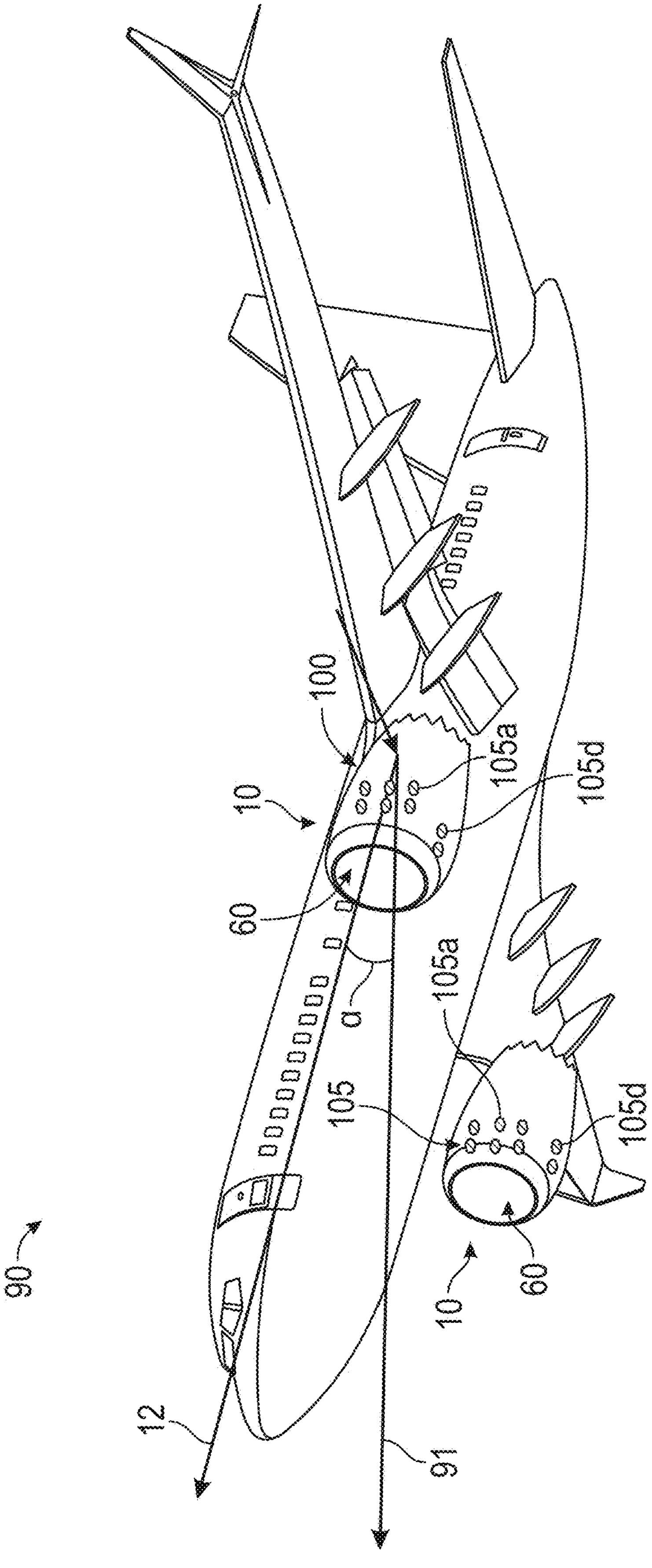
FIG. 1C is a schematic view of an aircraft with two turbine engines, according to the present disclosure.

FIG. 1B is a schematic front view of the turbine engine 10, according to the present disclosure. FIG. 1C illustrates an aircraft 90 having two turbine engines 10, according to the present disclosure. The turbine engine 10 includes a first horizontal side 15 and a second horizontal side 17 opposite the first horizontal side 15. The turbine engine 10 may be viewed with respect to a "clock" orientation having a twelve o'clock position, a three o'clock position, a six o'clock position, and a nine o'clock position, when viewed from a forward view of the turbine engine 10 (e.g., the view of FIG. 1B). Although not provided with reference numerals, the clock orientation is understood to include all clock positions therebetween. The twelve o'clock position is positioned at a top of the turbine engine 10 (e.g., at the top side 11), the three o'clock position is positioned ninety degrees (90°) from the twelve o'clock position (e.g., at the first horizontal side 15), the six o'clock position is positioned at a bottom of the turbine engine 10 (e.g., at the bottom side 13) and is one hundred eighty degrees (180°) from the twelve o'clock position, and the nine o'clock position is positioned ninety degrees (90°) from the six o'clock position (e.g., at the second horizontal side 17).

As shown in FIGS. 1B and 1C, the plurality of wind condition sensors 105 is positioned circumferentially about the nacelle 50. The plurality of wind condition sensors 105 includes a plurality of crosswind sensors 105*a*, 105*b* including one or more first crosswind sensors 105*a* and one or more second crosswind sensors 105*b*. The plurality of crosswind sensors 105*a*, 105*b* is positioned on the first horizontal side 15 of the turbine engine 10 and on the second horizontal side 17 of the turbine engine 10. In this way, the plurality of crosswind sensors 105*a*, 105*b* is positioned to sense the crosswind conditions of the ambient air about the turbine engine 10, as detailed further below. In particular, the one or more first crosswind sensors 105*a* are positioned on the nacelle 50 at the first horizontal side 15. The one or more second crosswind sensors 105*b* are positioned on the nacelle 50 at the second horizontal side 17. In FIG. 1B, the one or more first crosswind sensors 105*a* are positioned generally at the three o'clock position and the one or more second crosswind sensors 105*b* are positioned generally at the nine o'clock position. The one or more first crosswind sensors 105*a* include three first crosswind sensors at the first horizontal side 15. The one or more second crosswind sensors 105*b* include three second crosswind sensors at the second horizontal side 17. The one or more first crosswind sensors 105*a* and the one or more second crosswind sensors 105*b* can include any number of crosswind sensors at the first horizontal side 15 and at the second horizontal side 17, respectively, for sensing the crosswind conditions about the turbine engine 10.

The plurality of wind condition sensors 105 also includes a plurality of wind shear sensors 105*c*, 105*d* including one or more first wind shear sensors 105*c* and one or more second wind shear sensors 105*d*. The plurality of wind shear sensors 105*c*, 105*d* is positioned on the top side 11 of the turbine engine 10 and on the bottom side 13 of the turbine engine 10. In this way, the plurality of wind shear sensors 105*c*, 105*d* is positioned to sense wind shear conditions of the ambient air about the turbine engine 10, as detailed further below. In particular, the one or more first wind shear sensors 105*c* are positioned on the nacelle 50 at the top side 11. The one or more second wind shear sensors 105*d* are positioned on the nacelle 50 at the bottom side 13. In FIG. 1B, the one or more first wind shear sensors 105*c* are positioned generally at the twelve o'clock position and the one or more second wind shear sensors 105*d* are positioned generally at the six o'clock position. The one or more first wind shear sensors 105*c* include one first wind shear sensor at the top side 11. The one or more second wind shear sensors 105*d* include one second wind shear sensor at the bottom side 13. The one or more first wind shear sensors 105*c* and the one or more second wind shear sensors 105*d* can include any number of wind shear sensors at the top side 11 and at the bottom side 13, respectively, for sensing the wind shear conditions about the turbine engine 10.

The variable engine intake system 100 can also include additional sensors or signals for determining one or more of the following: altitude (e.g., pressure altitude or radar altitude above ground), throttle position, angle of attack (AOA), yaw, roll, aircraft flaps position, GPS location, or corresponding weather alerts. The variable engine intake system 100 can use such information in determining when to adjust the configuration of the engine intake 60, as detailed further below. As shown in FIG. 1C, the angle of attack $\alpha$ is an angle of the longitudinal centerline axis 12 of the turbine engine 10 with respect to a direction of travel 91 of the aircraft 90. In other words, the angle of attack $\alpha$ is the angle of the longitudinal centerline axis 12 of the turbine engine 10 with respect to a direction of flow of the inlet air 58 as the aircraft 90, and the turbine engine 10, move through the air.

Figure 2A:
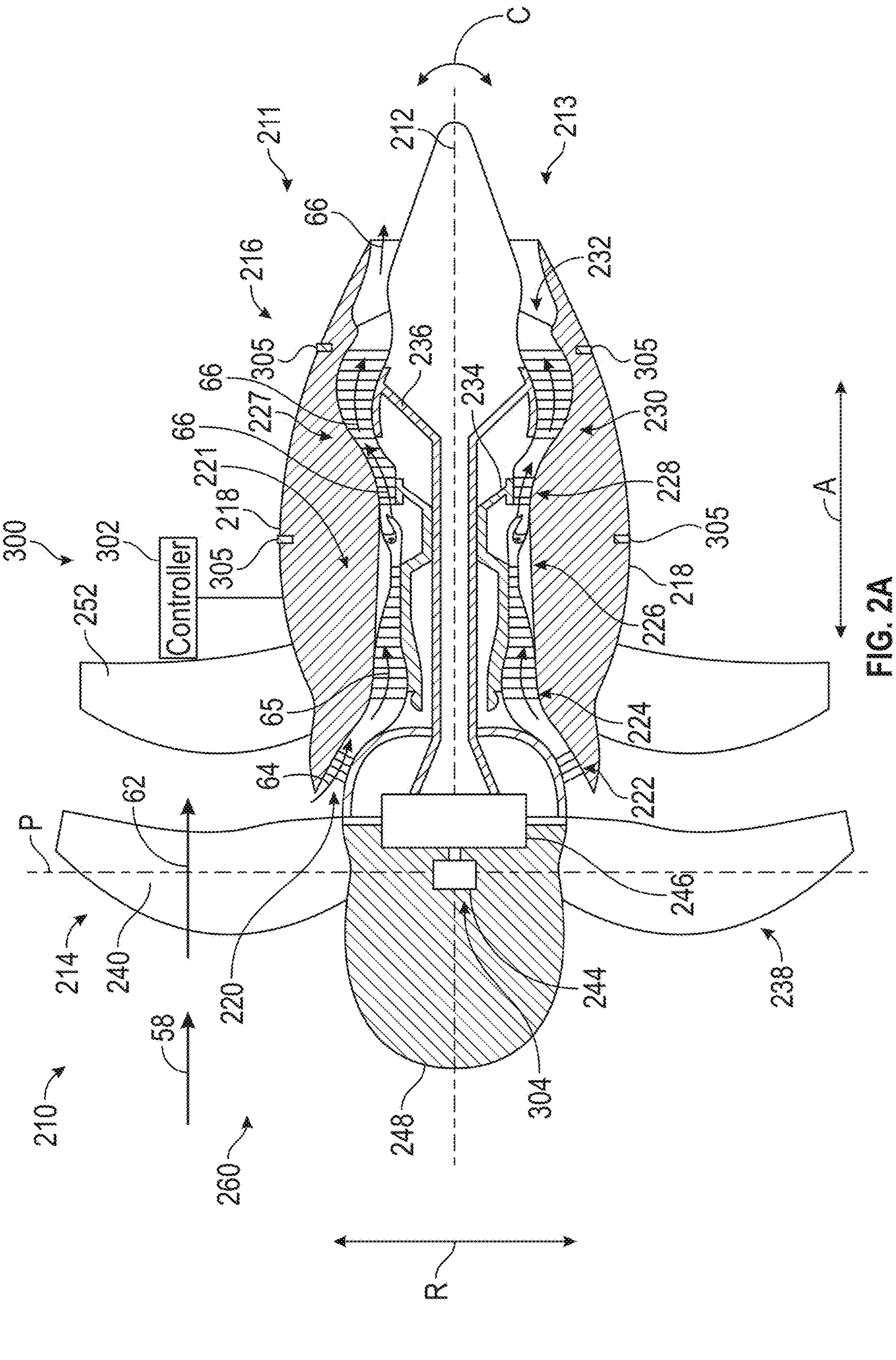
FIG. 2A is a schematic cross-sectional diagram of a turbine engine, taken along a longitudinal centerline axis of the turbine engine, according to another embodiment.

FIG. 2A is a schematic, cross-sectional view of a turbine engine 210, taken along a longitudinal centerline axis 212 of the turbine engine 210, according to another embodiment. The turbine engine 210 is an unducted single fan engine, and defines an axial direction A, a radial direction R, and a circumferential direction C. The turbine engine 210 is substantially similar to the turbine engine 10 of FIGS. 1A to 1C. The same or similar reference numerals will be used for components of the turbine engine 210 that are the same as or similar to the components of the turbine engine 10 discussed above, unless stated otherwise. The description of these components above also applies to this embodiment, and a detailed description of these components is omitted here.

The turbine engine 210 includes a fan section 214 and a turbo-engine 216 disposed downstream from the fan section 214. The turbo-engine 216 is enclosed by an outer casing 218 and includes a compressor section 221, a combustion section 226, and a turbine section 227. The outer casing 218 includes a core inlet 220. The compressor section 221 includes an LP compressor 222 and an HP compressor 224. The turbine section 227 includes an HP turbine 228 and an LP turbine 230. The turbo-engine 216 includes a jet exhaust nozzle section 232. The turbine engine 210 includes an HP shaft 234 and an LP shaft 236. The fan section 214 includes a fan 238 having a plurality of fan blades 240. Each of the fan blades 240 is rotatable about a pitch axis P by an actuator 244. The fan 238 is coupled to the LP shaft 236 through a gearbox assembly 246. The turbine engine 210 also includes a fan hub 248. The fan 238 is unducted such that there is no nacelle or duct that surrounds the fan 238. In this way, the turbine engine 210 is referred to as an open fan engine.

Figure 2B:
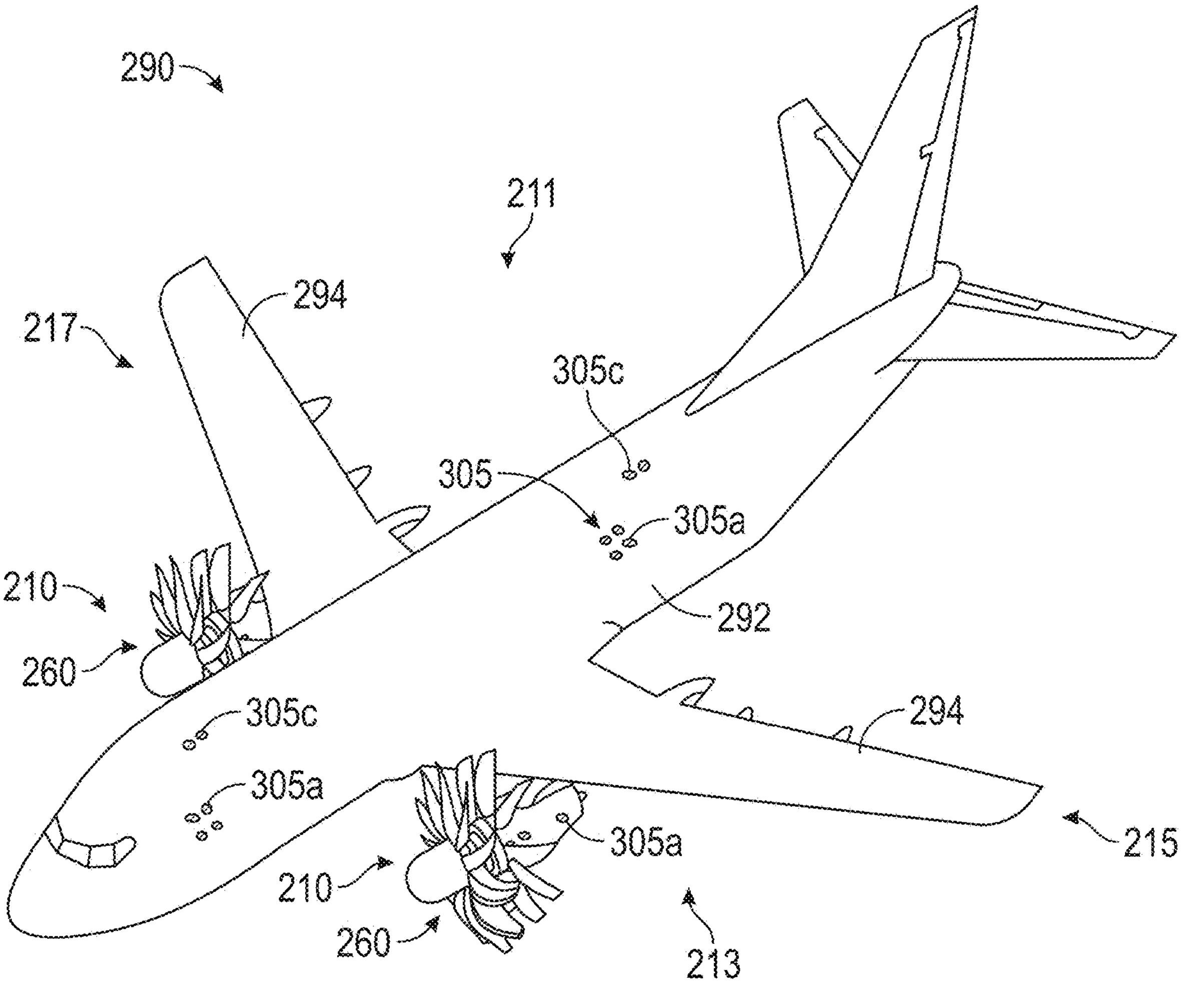
FIG. 2B is a schematic view of an aircraft with two turbine engines of FIG. 2A, according to the present disclosure.

The turbine engine 210 includes outlet guide vanes 252 that extend from the outer casing 218 downstream of the fan 238. The outlet guide vanes 252 can be fixed or can be variable pitch outlet guide vanes. In some embodiments, the outlet guide vanes 252 can be configured to rotate about the longitudinal centerline axis 212. The outlet guide vanes 252 may rotate counter to the fan blades 240 such that the one or more outlet guide vanes 252 are contra-rotating rotors in a contra-rotating open rotor (CROR) engine. The turbine engine 210 can be configured in a puller configuration as shown in FIGS. 2A and 2B, or in a pusher configuration in which the fan section 214 is located at an aft end of the turbine engine 210. In some embodiments, the turbine engine 210 can include inlet guide vanes positioned forward of the fan blades 240 and the inlet guide vanes can be variable pitch inlet guide vanes. The turbine engine 210 also includes an engine intake 260 defined by the fan section 214. The turbine engine 210 operates substantially similar to the turbine engine 10 of FIGS. 1A to 1C. While the turbine engine 210 is shown in a two-stream configuration (e.g., the core air 64 and the bypass air 62), the turbine engine 210 can be configured as a three-stream engine in which the turbine engine 210 includes an additional duct such that the core air 64 is split into two separate streams including one stream into through the core air flowpath and one stream through the additional duct. In this way, the three-stream engine provides three distinct streams of thrust-producing airflow during operation.

The turbine engine 210 includes a variable engine intake system 300 for adjusting a configuration of the engine intake 260. In particular, the variable engine intake system 300 is substantially similar to the variable engine intake system 100 of FIGS. 1A to 1C. In particular, the variable engine intake system 300 can control a pitch of the fan blades 240 or a pitch of the inlet guide vanes in response to detecting crosswind conditions or wind shear conditions, as detailed further below.

The variable engine intake system 300 includes a controller 302, one or more actuators 304, and a plurality of wind condition sensors 305. The one or more actuators 304 include the actuator 244 for adjusting the pitch of the fan blades 240. The plurality of wind condition sensors 305 is the same as the wind condition sensors 105 of FIGS. 1A to 1C and is placed at different positions on the turbine engine 210. In particular, the plurality of wind condition sensors 305 is positioned about the outer casing 218 and is aft of the outlet guide vanes 252.

FIG. 2B illustrates an aircraft 290 having two turbine engines 210, according to the present disclosure. The plurality of wind condition sensors 305 includes one or more first crosswind sensors 305*a* positioned on a first horizontal side 215 of the turbine engine 210. Although not shown in the view of FIG. 2B, the plurality of wind condition sensors 305 also includes one or more second crosswind sensors positioned on a second horizontal side 217 of the turbine engine 210. The plurality of wind condition sensors 305 can also include one or more first wind shear sensors and one or more second wind shear sensors. As shown in FIG. 2B, the aircraft 290 includes a fuselage 292 and wings 294. The plurality of wind condition sensors 305 can also include wind condition sensors positioned about the fuselage 292 of the aircraft 290. The plurality of wind condition sensors 305 is positioned on the fuselage 292 at least one of forward of the wings 294 or aft of the wings 294. In certain examples, the plurality of wind condition sensors 305 is positioned forward of the wings 294 to ensure a more accurate reading of the static pressure about the turbine engines 210 as compared to if the wind condition sensors 305 are positioned aft of the wings 294.

In FIG. 2B, the plurality of wind condition sensors 305 includes one or more first crosswind sensors 305*a* and one or more first wind shear sensors 305*c* (e.g., at the first horizontal side 215 and a top side 211, respectively). Although not shown in the view of FIG. 2B, the plurality of wind condition sensors 305 also includes one or more second crosswind sensors and one or more second wind shear sensors positioned about the fuselage 292 (e.g., at the second horizontal side 217 and a bottom side 213, respectively).

Figure 3:
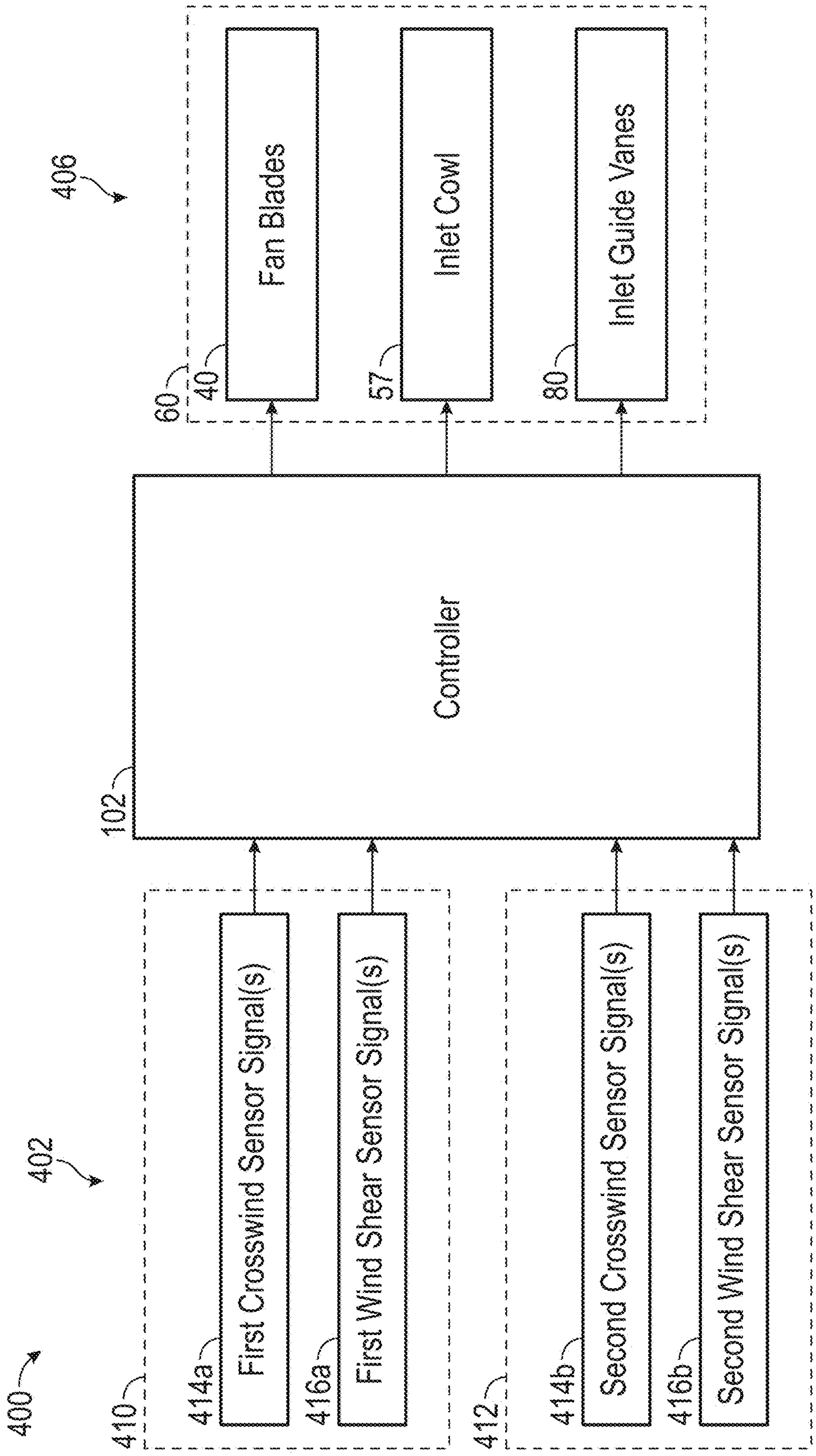
FIG. 3 is a schematic view of a variable engine intake control system for the turbine engine of FIG. 1A, according to the present disclosure.

FIG. 3 is a schematic view of a variable engine intake control system 400 for the turbine engine 10 (FIG. 1A), according to the present disclosure. While the variable engine intake control system 400 is detailed herein with respect to the turbine engine 10 of FIGS. 1A to 1C, the variable engine intake control system 400 can be utilized for controlling aspects of the turbine engine 210 of FIGS. 2A and 2B. The variable engine intake control system 400 includes inputs 402, the controller 102, and outputs 406. The inputs 402 include one or more first wind condition sensor signals 410 from the plurality of wind condition sensors 105 (FIGS. 1A to 1C) on a first side of the turbine engine 10, and one or more second wind condition sensor signals 412 from the plurality of wind condition sensors 105 on a second side of the turbine engine 10. In particular, the one or more first wind condition sensor signals 410 include one or more first crosswind sensor signals 414*a* from the one or more first crosswind sensors 105*a* (FIG. 1B) on the first horizontal side 15 (FIG. 1B) of the turbine engine 10 (FIG. 1B), and one or more first wind shear sensor signals 416*a* from the one or more first wind shear sensors 105*c* (FIG. 1B) on the top side 11 (FIG. 1B) of the turbine engine 10. The one or more second wind condition sensor signals 412 include one or more second crosswind sensor signals 414*b* from the one or more second crosswind sensors 105*b* (FIG. 1B) on the second horizontal side 17 (FIG. 1B), and one or more second wind shear sensor signals 416*b* from the one or more second wind shear sensors 105*d* (FIG. 1B) on the bottom side 13 (FIG. 1B).

The one or more first wind condition sensor signals 410 and the one or more second wind condition sensor signals 412 include electrical signals indicative of the ambient air about the turbine engine 10 (e.g., one or more ambient air signals) from the plurality of wind condition sensors 105 on the first side of the turbine engine 10 and from the plurality of wind condition sensors 105 on the second side of the turbine engine, respectively. In particular, the one or more first wind condition sensor signals 410 and the one or more second wind condition sensor signals 412 include electrical signals indicative of the pressure of the ambient air about the turbine engine 10.

The outputs 406 include control of the variable engine intake system 100 (e.g., a control signal to the variable engine intake system 100). In particular, the outputs 406 include control of one or more actuators 104 (FIG. 1A) for controlling at least one of the fan blades 40, the inlet cowl 57, or the inlet guide vanes 80. The controller 102 receives the inputs 402, implements a method 500 (FIG. 4) of operating the variable engine intake system 100, and controls the variable engine intake system 100, as described with reference to FIG. 4 below. The controller 102 is communicatively coupled to the plurality of wind condition sensors 105 and the variable engine intake system 100 (e.g., the one or more actuators 104). The controller 102 receives the inputs 402 and controls the variable engine intake system 100, as detailed further below.

Figure 4:
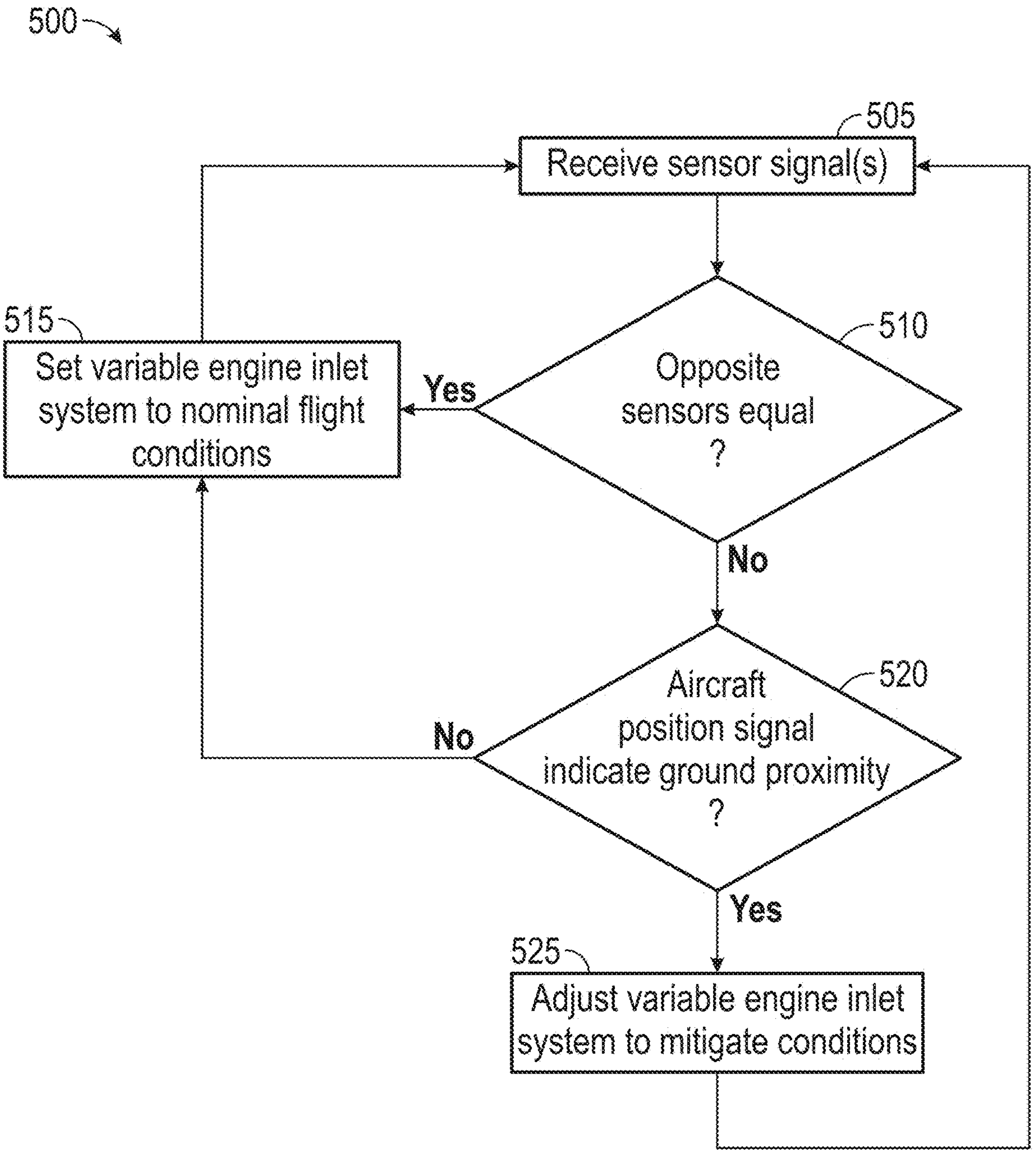
FIG. 4 is a flowchart of a method of operating the variable engine intake system of the turbine engine of FIG. 1A, according to the present disclosure.

FIG. 4 is a flowchart of a method 500 of operating the variable engine intake system 100 of the turbine engine 10, according to the present disclosure. The description of the method 500 refers to the turbine engine 10 and the variable engine intake system 100 of FIGS. 1A to 1C. The method 500 can also be utilized with the turbine engine 210 and the variable engine intake system 300 of FIGS. 2A and 2B.

In step 505, the controller 102 receives one or more sensor signals indicative of the wind conditions about the turbine engine 10 from the plurality of wind condition sensors 105. In particular, the controller 102 receives the one or more first wind condition sensor signals 410 from one or more wind condition sensors 105 on the first side of the turbine engine 10 and receives the one or more second wind condition sensor signals 412 from one or more wind condition sensors 105 on the second side of the turbine engine 10. In one embodiment, the controller 102 receives the one or more first crosswind sensor signals 414*a* from the one or more first crosswind sensors 105*a* on the first horizontal side 15, and receives the one or more second crosswind sensor signals 414*b* from the one or more second crosswind sensors 105*b* on the second horizontal side 17. In another embodiment, the controller 102 receives the one or more first wind shear sensor signals 416*a* from the one or more first wind shear sensors 105*c* on the top side 11, and receives the one or more second wind shear sensor signals 416*b* from the one or more second wind shear sensors 105*d* on the bottom side 13. In some embodiments, the controller 102 can receive the first crosswind sensor signals 414*a*, the second crosswind sensor signals 414*b*, the first wind shear sensor signals 416*a*, and the second wind shear sensor signals 416*b*.

In step 510, the controller 102 determines whether the one or more wind condition sensor signals from opposite wind condition sensors 105 are substantially equal (e.g., within a one percent margin, a two percent margin, a four percent margin, a ten percent margin, a fifteen percent margin, or a twenty percent margin of each other). In particular, the controller 102 determines whether the one or more first wind condition sensor signals 410 are substantially equal to the one or more second wind condition sensor signals 412. For example, the controller 102 determines whether the one or more first crosswind sensor signals 414*a* are substantially equal to the one or more second crosswind sensor signals 414*b*. The controller 102 also determines whether the one or more first wind shear sensor signals 416*a* are substantially equal to the one or more second wind shear sensor signals 416*b*. In particular, the controller 102 determines the static pressure from the one or more first wind condition sensor signals 410 and determines the static pressure from the one or more second wind condition sensor signals 412. The controller 102 then determines if the static pressure from the first wind condition sensor signals 410 is substantially equal to the static pressure from the second wind condition sensor signals 412.

In step 515, the controller 102 sets the variable engine intake system 100 to nominal flight conditions (e.g., sets the engine inlet 61 to a nominal configuration that includes the fully retracted position or the fully closed position) if the one or more first wind condition sensor signals 410 are substantially equal to the one or more second wind condition sensor signals 412 (step 510: Yes). This indicates that there is no crosswind or that there is no wind shear. For example, if the first crosswind sensor signals 414*a* are substantially equal to the second crosswind sensor signals 414*b*, then there is no crosswind (or the crosswind is below a crosswind threshold). Similarly, if the first wind shear sensor signals 416*a* are substantially equal to the second wind shear sensor signals 416*b*, then there is no wind shear (or the wind shear is below a wind shear threshold). In some embodiments, the controller 102 sets the variable engine intake system 100 to the nominal flight conditions if the wind conditions (e.g., the crosswind or the wind shear) are less than a wind condition threshold (e.g., the crosswind threshold or the wind shear threshold, respectively). For example, the wind condition threshold can be ten miles per hour (10 mph), twenty miles per hour (20 mph), etc. The method 500 then continues back to step 505 and step 510.

If the first wind condition sensor signals 410 are not substantially equal to (e.g., are different than) the second wind condition sensor signals 412, the method 500 continues to step 520 (step 510: No). Such a condition indicates that there is crosswind conditions or wind shear conditions about the turbine engine 10. For example, if the first crosswind sensor signals 414*a* are different than the second crosswind sensor signals 414*b*, then there is crosswind. Similarly, if the first wind shear sensor signals 416*a* are different than the second wind shear sensor signals 416*b*, then there is wind shear. In some embodiments, the method 500 continues to step 520 if the wind conditions are greater than the wind condition threshold (e.g., 10 mph or 20 mph).

In step 520, the controller 102 determines whether the aircraft 90 is within a ground proximity based on one or more aircraft position signals (e.g., from the altitude sensors) indicative of the aircraft position. For example, the controller 102 receives the aircraft position signals from the altitude sensors and determines the altitude based on the aircraft position signals. The controller 102 determines that the aircraft 90 is in ground proximity if the altitude is below a predetermined altitude threshold (e.g., below 5,000 feet). Such a condition occurs, for example, when the aircraft 90 is taking off or landing. The method 500 returns to step 515 if the aircraft position signals do not indicate ground proximity (step 520: No). The method 500 proceeds to step 525 if the aircraft position signals indicate ground proximity (step 520: Yes).

In step 525, the controller 102 adjusts the variable engine intake system 100 to mitigate the wind conditions (e.g., minimizes air flow separation from the engine intake 60 to prevent the fan 38 from stalling). In particular, the controller 102 controls the one or more actuators 104 to adjust a configuration of the variable engine intake system 100. For example, the controller 102 controls the one or more actuators 104 to adjust the configuration of the engine intake 60 including adjusting at least one of the pitch of the fan blades 40, the configuration of the inlet cowl 57, or the pitch of the inlet guide vanes 80. The variable engine intake system 100 can adjust the pitch of individual inlet guide vanes 80, a grouping of the inlet guide vanes 80, or the entirety of the inlet guide vanes 80 in unison. Mitigating the wind conditions includes minimizing the air flow separation from the engine intake 60 to prevent the fan 38 from stalling or from a partial stall by reducing turbulence through the fan 38 due to the wind conditions.

Adjusting the configuration of the inlet cowl 57 can include any of the inlet cowl 57 configurations detailed herein, including, for example, adjusting a length of the engine inlet 61 by translating the inlet cowl 57 axially forward or axially aft (FIGS. 5A to 8B), adjusting a droop angle of the engine inlet 61 by tilting the inlet cowl 57 forward or aft (FIGS. 10A to 11B), or adjusting a diameter of the engine inlet 61 by opening or closing the inlet cowl 57 (FIGS. 12A to 13F). When the controller 102 has adjusted the variable engine intake system 100, the method 500 returns to repeat from step 505.

Figure 5A:
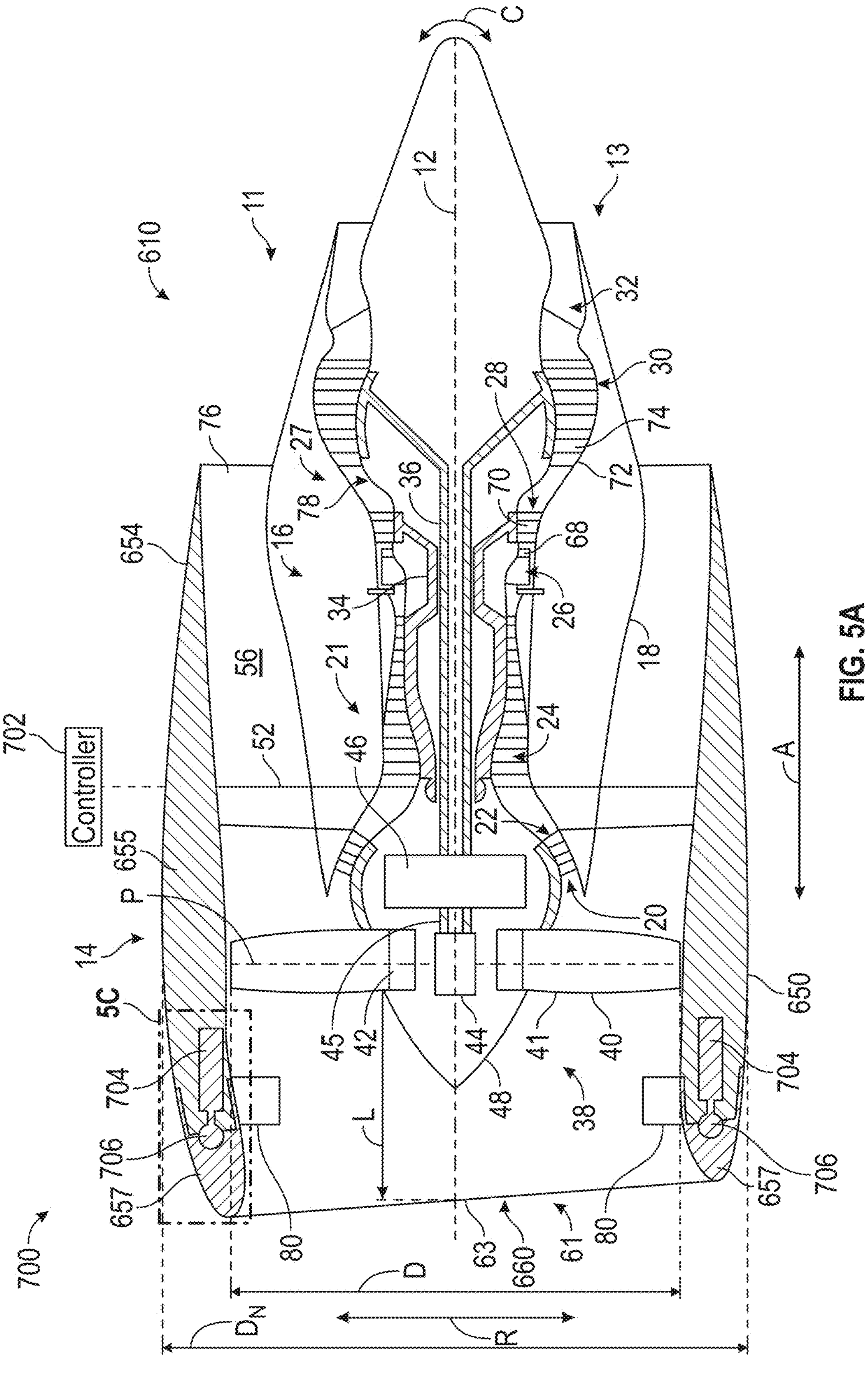
FIG. 5A is a schematic cross-sectional diagram of a turbine engine, taken along a longitudinal centerline axis of the turbine engine, with a variable engine intake system in a fully retracted position, according to another embodiment.
Figure 5B:
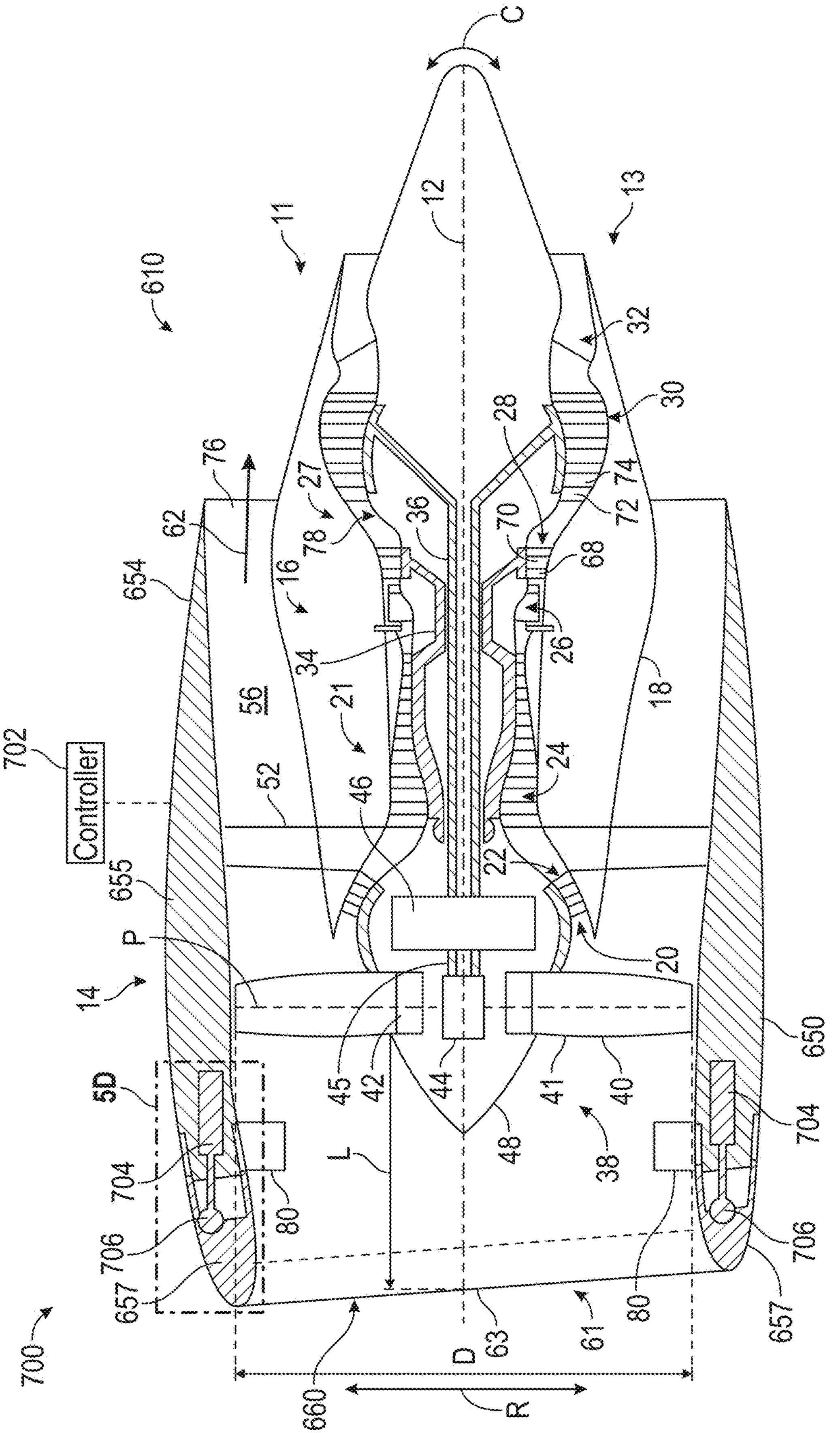
FIG. 5B is a is a schematic cross-sectional diagram of the turbine engine of FIG. 5A, with the variable engine intake system in a fully extended position, according to the present disclosure.
Figure 5C:
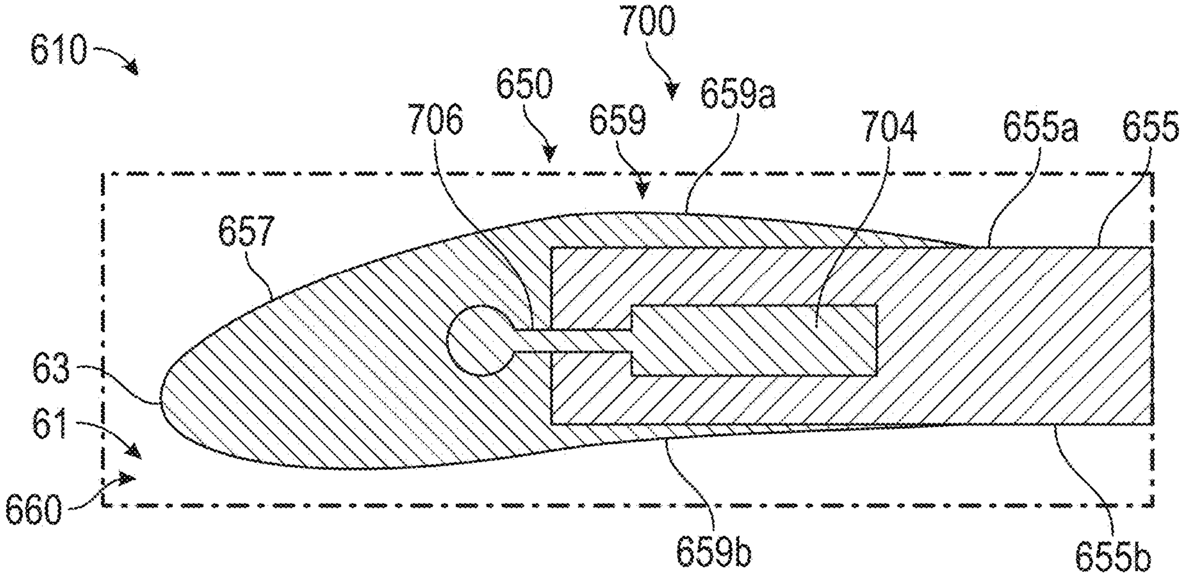
FIG. 5C is a partial schematic cross-sectional diagram of the turbine engine of FIG. 5A, taken at detail 5C, according to the present disclosure.
Figure 5D:
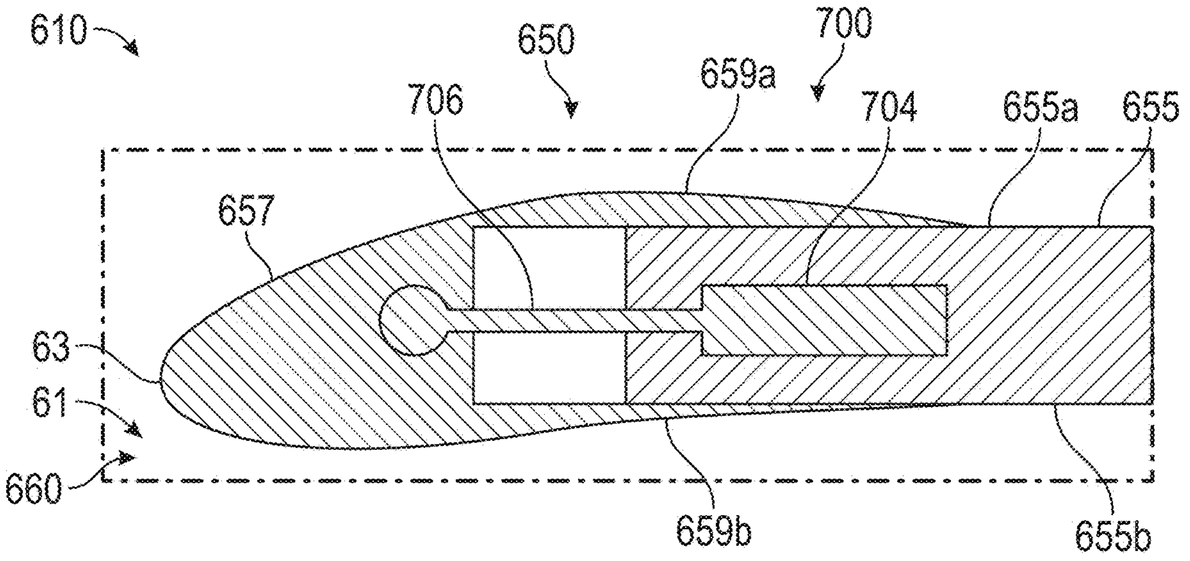
FIG. 5D is a partial schematic cross-sectional diagram of the turbine engine of FIG. 5B, taken at detail 5D, according to the present disclosure.

FIG. 5A is a schematic cross-sectional diagram of a turbine engine 610, taken along the longitudinal centerline axis 12 of the turbine engine 610 with a variable engine intake system 700 in a fully retracted position, according to another embodiment. FIG. 5B is a schematic cross-sectional diagram of the turbine engine 610 with the variable engine intake system 700 in a fully extended position, according to the present disclosure. FIG. 5C is an enlarged schematic cross-sectional diagram of the turbine engine 610, taken at detail 5C in FIG. 5A, according to the present disclosure. FIG. 5D is an enlarged schematic cross-sectional diagram of the turbine engine 610, taken at detail 5D in FIG. 5B, according to the present disclosure. The turbine engine 610 is substantially similar to the turbine engine 10 of FIGS. 1A to 1C. The same or similar reference numerals will be used for components of the turbine engine 610 that are the same as or similar to the components of the turbine engine 10 discussed above, unless stated otherwise. The description of these components above also applies to this embodiment, and a detailed description of these components is omitted here.

The turbine engine 610 includes a nacelle 650 having a downstream section 654, a fan cowl 655, and an inlet cowl 657. The turbine engine 610 also includes an engine intake 660 and the variable engine intake system 700. The engine inlet 61 of the turbine engine 610 has an inlet length L and an inlet diameter D, as defined above with respect to FIG. 1A. The turbine engine 610 also includes a nacelle diameter $D_N$ that is defined as a maximum diameter of the nacelle 650.

The variable engine intake system 700 includes a controller 702 and one or more actuators 704. The one or more actuators 704 are linear actuators and each includes a rod 706 that is coupled to the inlet cowl 657 for translating the inlet cowl 657 forward and aftward, as detailed further below. In the embodiment of FIGS. 5A to 5D, the one or more actuators 704 include two actuators 704, including one actuator 704 positioned on the top side 11 and one actuator 704 positioned on the bottom side 13 of the nacelle 50. The one or more actuators 704 can include any number of actuators positioned circumferentially about the nacelle 50 for translating the inlet cowl 657 forward and aftward.

A ratio of the inlet length L to the inlet diameter D (L/D) changes as the variable engine intake system 700 translates the inlet cowl 657 forward and afterward. In particular, the L/D of the engine inlet 61 is a minimum when the inlet length L is at a minimum inlet length ($L_{min}$). The inlet length L is at the minimum inlet length $L_{min}$ when the variable engine intake system 700 is at the fully retracted position (FIGS. 5A and 5C). The L/D of the engine inlet 61 is a maximum when the inlet length L is at a maximum inlet length ($L_{max}$). The inlet length L is at the maximum inlet length Lmax when the variable engine intake system 700 is at the fully extended position (FIGS. 5B and 5D). The L/D of the engine inlet 61 is in a range such as 0.2 to 1.0, 0.25 to 0.4, etc. A ratio of $L_{max}$ to $L_{min}$ ($L_{max}/L_{min}$) of the engine inlet 61 is in a range of 1.1 to 2.0. A ratio of the inlet length L to the nacelle diameter $D_N$ ($L/D_N$) changes as the variable engine intake system 700 translates the inlet cowl 657 forward and aftward. In particular, the $L/D_N$ is always less than the L/D. The $L/D_N$ is in a range such as 0.12 to 0.9, 0.15 to 0.35, etc.

As shown in FIGS. 5C and 5D, the inlet cowl 657 includes one or more extension portions 659. The extension portions 659 extend aftward from the inlet cowl 657 and extend over the fan cowl 655. In particular, the extension portions 659 include a radially outer extension portion 659*a* and a radially inner extension portion 659*b*. The radially outer extension portion 659*a* extends over a radially outer surface 655*a* of the fan cowl 655. The radially inner extension portion 659*b* extends over a radially inner surface 655*b* of the fan cowl 655. The extension portions 659 are tapered from the inlet cowl 657 to the fan cowl 655 such that there is a smooth transition from the extension portions 659 to the fan cowl 655. In particular, the radially outer extension portion 659*a* tapers from the inlet cowl 657 to the radially outer surface 655*a* of the fan cowl 655. The radially inner extension portion 659*b* tapers from the inlet cowl 657 to the radially inner surface 655*b* of the fan cowl 655. In this way, the extension portions 659 form fit onto the fan cowl 655.

The extension portions 659 form a continuous ring. The inlet cowl 657, and, thus, the engine inlet 61, is generally cylindrical. The inlet cowl 657 (and the engine inlet 61) can include any shape, such as, for example, ovoid, elliptical, or the like. A gap between the inlet cowl 657 (e.g., the extension portions 659) and the fan cowl 655 is less than about 0.1 inches when the variable engine intake system 700 is in the fully retracted position (FIG. 5C) such the extension portions 659 prevent ambient air outside of the turbine engine 610 from entering the turbine engine 610 through the nacelle 650 at a location other than the engine inlet 61. In some embodiments, a seal is positioned between the inlet cowl 657 and the fan cowl 655 to prevent air from flowing between inlet cowl 657 and the fan cowl 655.

In operation, the variable engine intake system 700 adjusts an axial position of the inlet cowl 657 (via the one or more actuators 704) to adjust the inlet length L of the engine inlet 61. In this way, the turbine engine 610 has a variable length engine inlet. In particular, the controller 702 controls the one or more actuators 704 to extend the inlet cowl 657 (by extending the rod 706) from the fully retracted position (FIGS. 5A and 5C) to the fully extended position (FIGS. 5B and 5D). This causes the inlet length L (and the L/D) to increase from $L_{min}$ to $L_{max}$. The variable engine intake system 700 can control the inlet cowl 657 to any position between the fully retracted position and the fully extended position to achieve a desired L/D. As shown in FIGS. 5B and 5D, the inlet cowl 657 maintains contact (e.g., either directly or via a seal) with the fan cowl 655 when the inlet cowl 657 is extended. In this way, the inlet cowl 657 prevents the ambient air from flowing through the nacelle 650 at a location other than the engine inlet 61.

The controller 702 also controls the one or more actuators 704 to retract the inlet cowl 657 (by retracting the rod 706) from the fully extended position to the fully retracted position. The controller 702 can control the one or more actuators 704 to extend or to retract the inlet cowl 657 to any axial position between the fully retracted position and the fully extended position. In one embodiment, the variable engine intake system 700 adjusts the axial position of the inlet cowl 657 based on wind conditions (e.g., crosswind conditions or wind shear conditions), as detailed above with respect to FIGS. 1A to 4. In this way, the variable engine intake system 700 adjusts the inlet length L of the engine inlet 61 (e.g., by adjusting the axial position of the inlet cowl 657) to mitigate the wind conditions (e.g., to minimize air flow separation from the engine intake 660). In particular, the controller 702 extends the inlet cowl 657 based on the wind conditions when the altitude is less than the predetermined altitude threshold (e.g., 5,000 feet), as detailed above. The controller 702 retracts the inlet cowl 657 when the altitude is greater than the predetermined altitude threshold, thereby shortening the engine inlet 61 (e.g., reducing the inlet length L) and reducing drag on the turbine engine 610.

Figure 6:
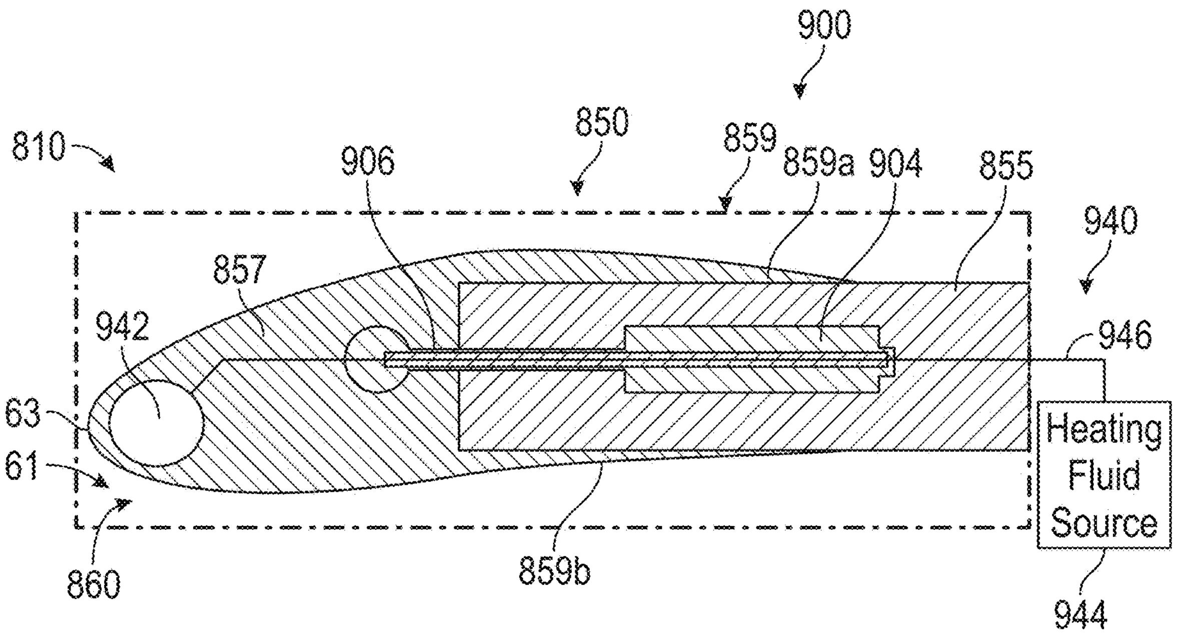
FIG. 6 is an enlarged partial cross-sectional diagram of a turbine engine, taken along a longitudinal centerline axis of the turbine engine, according to another embodiment.

FIG. 6 is an enlarged partial schematic cross-sectional diagram of a turbine engine 810, taken along a longitudinal centerline axis of the turbine engine 810, according to another embodiment. The turbine engine 810 is substantially similar to the turbine engine 10 of FIGS. 1A to 1C. The same or similar reference numerals will be used for components of the turbine engine 810 that are the same as or similar to the components of the turbine engine 10 discussed above, unless stated otherwise. The description of these components above also applies to this embodiment, and a detailed description of these components is omitted here.

The turbine engine 810 has an engine intake 860 and includes a nacelle 850 having a fan cowl 855 and an inlet cowl 857. The inlet cowl 857 includes one or more extension portions 859 including a radially outer extension portion 859*a* and a radially inner extension portion 859*b*. The turbine engine 810 includes a variable engine intake system 900 that includes a controller (not shown in the view of FIG. 6) and one or more actuators 904 that each includes a rod 906 coupled to the inlet cowl 857.

The turbine engine 810 also includes a heating system 940 for heating the inlet cowl 857. The heating system 940 can be an anti-ice heating system for preventing, or removing, ice from the inlet cowl 857. In particular, the heating system 940 is a pneumatic heating system that includes a heating element 942, a heating fluid source 944, and a heating fluid line 946. The heating element 942 is positioned in the inlet cowl 857 and is fluidly coupled to the heating fluid source 944 via the heating fluid line 946. The heating element 942 is a hollow tube, or the like, that extends circumferentially about an interior of the inlet cowl 857. In this way, the heating element 942 is annular. In some embodiments, the heating element 942 can include a plurality of heating elements 942 that is spaced circumferentially about the inlet cowl 857. Each of the plurality of heating elements 942 can be coupled to the heating fluid line 946. The heating fluid source 944 is heated air, such as, for example, hot bleed air from the compressor section 21 (FIG. 1A) of the turbine engine 810. In particular, the HP compressor 24 includes one or more bleed air flowpaths that are fluidly coupled to the heating fluid line 946 for supplying the hot bleed air to the heating element 942 via the heating fluid line 946. The heating fluid line 946 is a flexible tube, or the like, that extends from the heating fluid source 944 to the heating element 942. In particular, the heating fluid line 946 extends through the rod 906 of a first actuator 904 for supplying the heating fluid to the heating element 942. The heating fluid line 946 also extends through the rod 906 of a second actuator 904 for returning cooled fluid to a hot component (e.g., turbine blades or turbine vanes) of the turbine engine 810 to cool the hot component.

In operation, the heating system 940 supplies the heating fluid from the heating fluid source 944 to the heating element 942 through the heating fluid line 946. The heating fluid flows about the heating element 942 to heat the inlet cowl 857. In this way, the heating system 940 heats the inlet cowl 857 to prevent, or to remove, ice from the inlet cowl 857. In particular, the heat is transferred from the heating fluid to the inlet cowl 857 via the heating element 942 such that the heating fluid in the heating element 942 becomes cooled fluid. The cooled fluid flows through the heating fluid line 946 of the second actuator 904 and is routed to the hot component of the turbine engine 810 for cooling the hot component.

Figure 7:
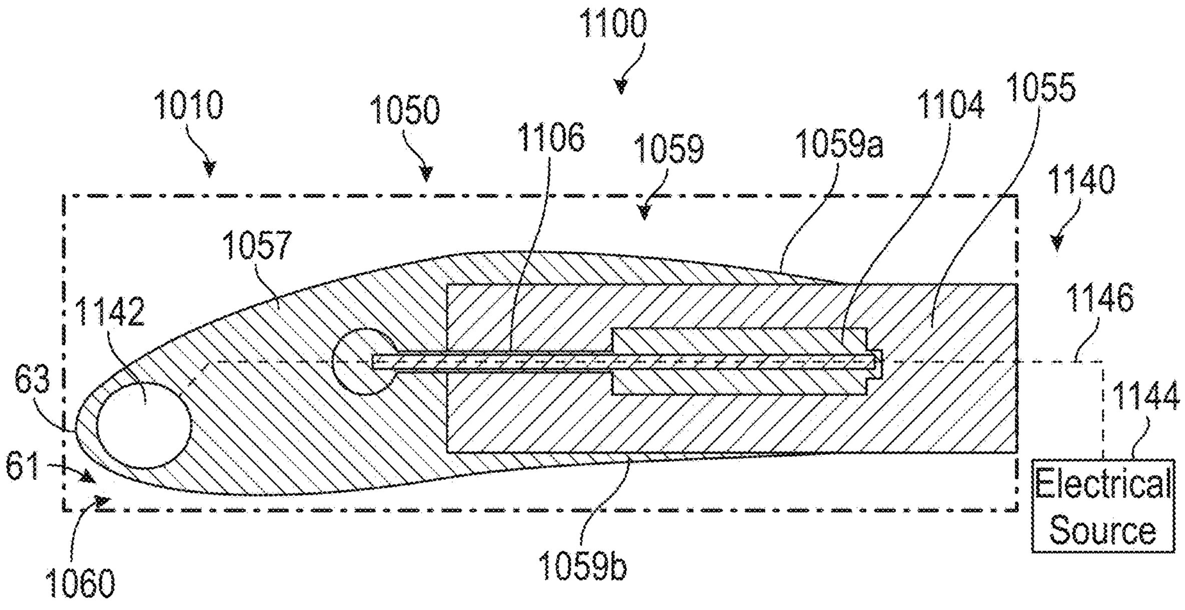
FIG. 7 is an enlarged partial cross-sectional diagram of a turbine engine, taken along a longitudinal centerline axis of the turbine engine, according to another embodiment.

FIG. 7 is an enlarged partial schematic cross-sectional diagram of a turbine engine 1010, taken along a longitudinal centerline axis of the turbine engine 1010, according to another embodiment. The turbine engine 1010 is substantially similar to the turbine engine 10 of FIGS. 1A to 1C. The same or similar reference numerals will be used for components of the turbine engine 1010 that are the same as or similar to the components of the turbine engine 10 discussed above, unless stated otherwise. The description of these components above also applies to this embodiment, and a detailed description of these components is omitted here.

The turbine engine 1010 has an engine intake 1060 and includes a nacelle 1050 having a fan cowl 1055 and an inlet cowl 1057. The inlet cowl 1057 includes one or more extension portions 1059 including a radially outer extension portion 1059*a* and a radially inner extension portion 1059*b*. The turbine engine 1010 includes a variable engine intake system 1100 that includes a controller (not shown in the view of FIG. 7) and one or more actuators 1104 that each includes a rod 1106 coupled to the inlet cowl 1057.

The turbine engine 1010 also includes a heating system 1140 for heating the inlet cowl 1057. The heating system 1140 can be an anti-ice heating system for preventing, or removing, ice from the inlet cowl 1057. In particular, the heating system 940 is an electrical heating system that includes a heating element 1142, an electrical source 1144, and an electrical line 1146. The heating element 1142 is positioned in the inlet cowl 1057 and is coupled to the electrical source 1144 via the electrical line 1146. The heating element 1142 is an electrical line, coil, or the like, that extends circumferentially about an interior of the inlet cowl 1057. In this way, the heating element 1142 is annular. In some embodiments, the heating element 1142 can include a plurality of heating elements 1142 that is spaced circumferentially about the inlet cowl 1057. Each of the plurality of heating elements 1142 can be coupled to the electrical line 1146. The electrical source 1144 can include, for example, a battery, an auxiliary power unit, an electric motor/generator, or the like. The electrical line 1146 is an electrical cable, or the like, that extends from the electrical source 1144 to the heating element 1142. In particular, the electrical line 1146 extends through the rod 1106 of a respective actuator 1104 for supplying the electricity to the heating element 1142.

In operation, the heating system 1140 supplies the electricity from the electrical source 1144 to the heating element 1142 via the electrical line 1146. The electricity powers the heating element 1142 to heat up, thereby heating the inlet cowl 1057. In this way, the heating system 1140 heats the inlet cowl 1057 to prevent, or to remove, ice from the inlet cowl 1057. In particular, the heat is transferred from the heating element 1142 to the inlet cowl 1057.

Figure 8A:
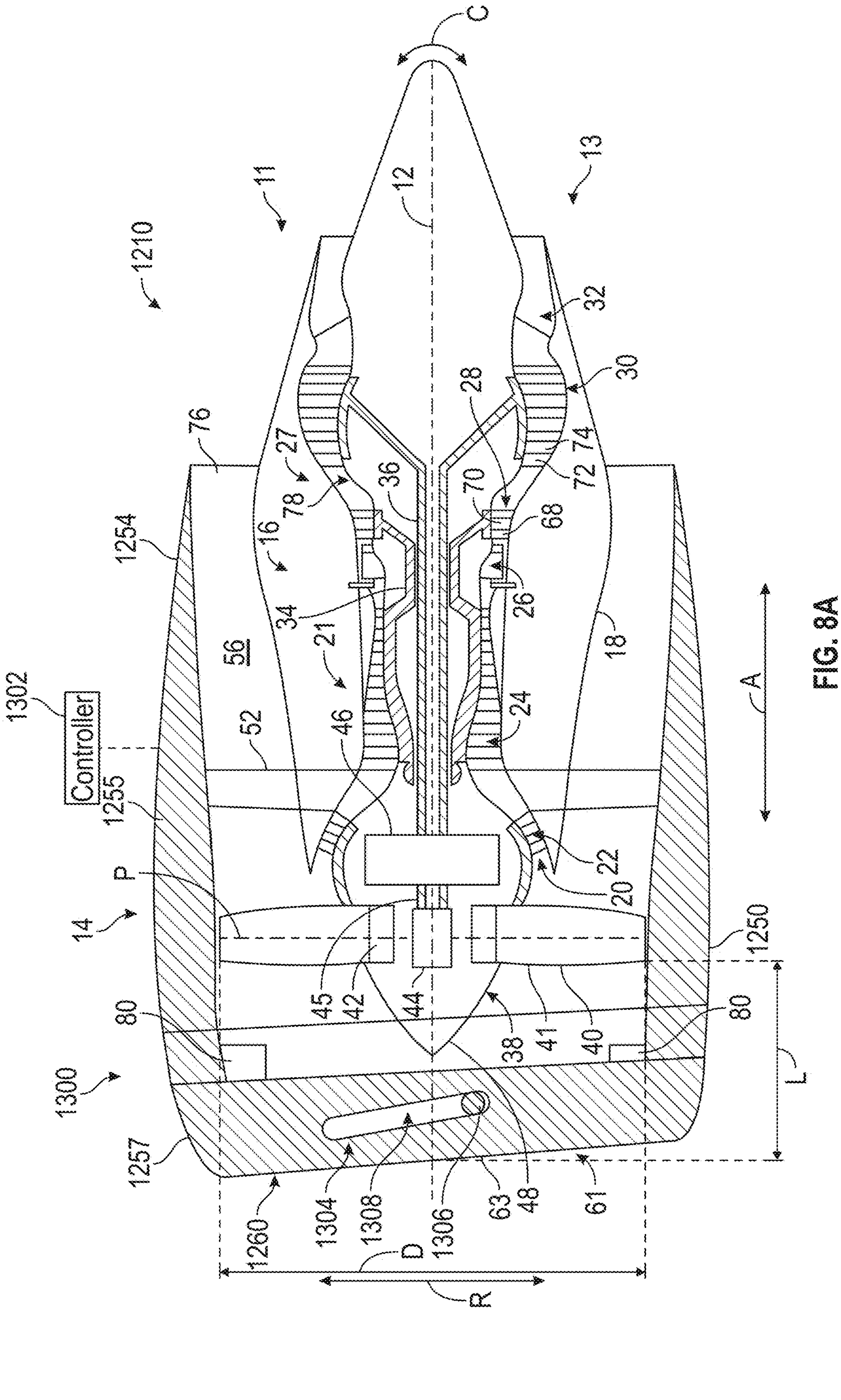
FIG. 8A is a schematic cross-sectional diagram of a turbine engine, taken along a longitudinal centerline axis of the turbine engine, with a variable engine intake system in a fully retracted position, according to another embodiment.
Figure 8B:
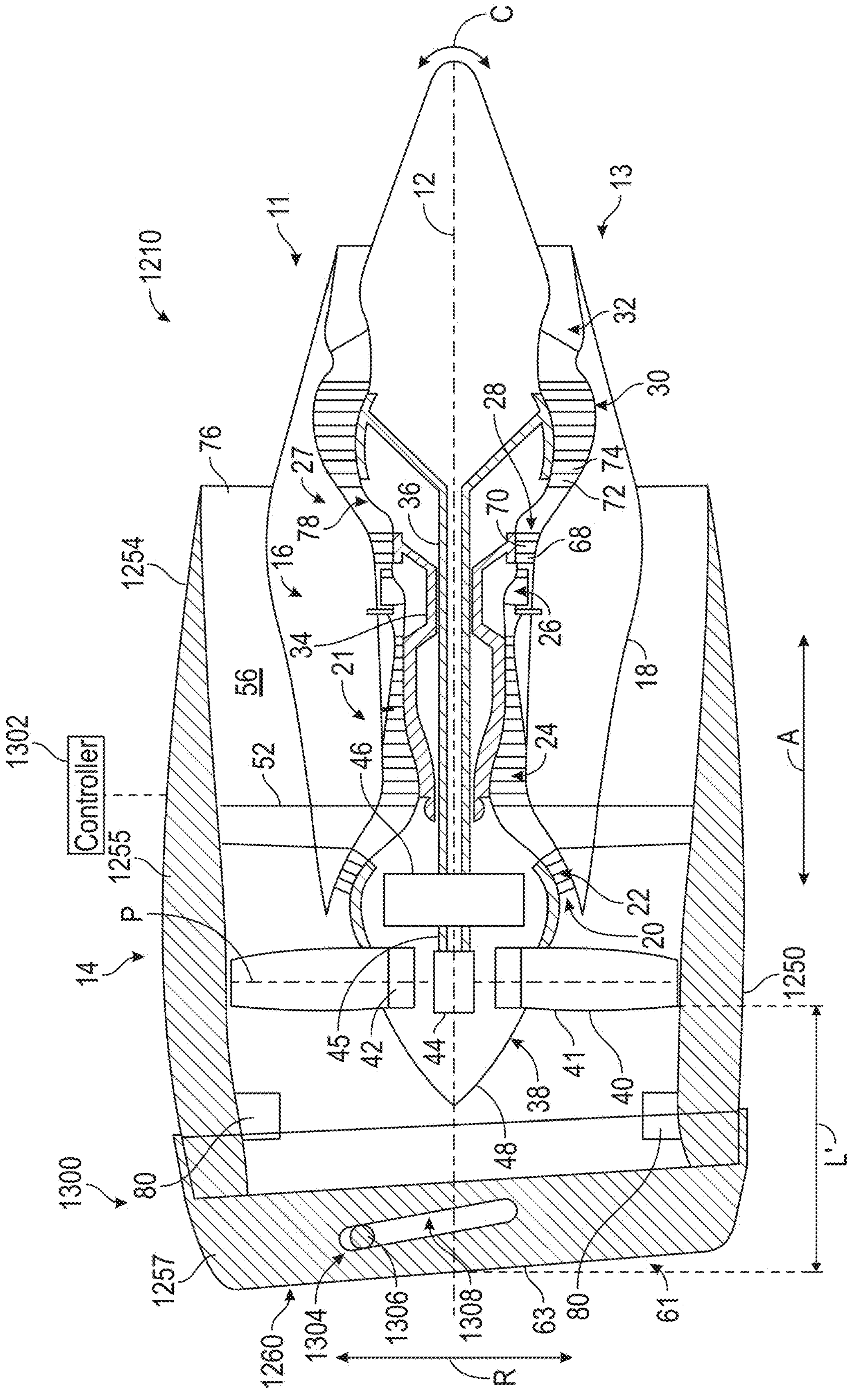
FIG. 8B is a schematic cross-sectional diagram of the turbine engine of FIG. 8A with the variable engine intake system in a fully extended position, with according to the present disclosure.

FIG. 8A is a schematic cross-sectional diagram of a turbine engine 1210, taken along the longitudinal centerline axis 12 of the turbine engine 1210 with a variable engine intake system 1300 in a fully retracted position, according to another embodiment. FIG. 8B is a schematic cross-sectional diagram of the turbine engine 1210 with the variable engine intake system 1300 in a fully extended position, according to the present disclosure. The turbine engine 1210 is substantially similar to the turbine engines 10 and 610 of FIGS. 1A to 1C and 5A to 5D, respectively. The same or similar reference numerals will be used for components of the turbine engine 1210 that are the same as or similar to the components of the turbine engine 10 discussed above, unless stated otherwise. The description of these components above also applies to this embodiment, and a detailed description of these components is omitted here.

The turbine engine 1210 includes a nacelle 1250 having a downstream section 1254, a fan cowl 1255, and an inlet cowl 1257. The turbine engine 1210 also includes an engine intake 1260 and the variable engine intake system 1300. The variable engine intake system 1300 includes a controller 1302 and one or more actuators 1304. The one or more actuators 1304 each includes a pin 1306 that is coupled to the inlet cowl 1257 for translating the inlet cowl 1257 forward and aftward, as detailed further below. In FIGS. 8A and 8B, the one or more actuators 1304 include one or more helical tracks 1308. The pin 1306 is mounted in the helical tracks 1308 and the actuators 1304 include a motor for moving the pin 1306 along the helical tracks 1308. The turbine engine 1210 has an inlet length L and an inlet diameter D of the engine inlet 61. The ratio of the inlet length L to the inlet diameter D (L/D) is in a range of 0.3 to 1.0.

The variable engine intake system 1300 operates substantially similar to the variable engine intake system 700 of FIGS. 5A to 5D. The variable engine intake system 1300 adjusts an axial position of the inlet cowl 1257 (via the one or more actuators 1304) to adjust the inlet length L of the engine inlet 61. In this way, the turbine engine 1210 has a variable length engine inlet. The controller 1302 controls the one or more actuators 1304 to move the pin 1306 radially along the helical tracks 1308 in a first radial direction (e.g., towards the top side 11 of the turbine engine 1210). As the pin 1306 moves along the helical tracks 1308 in the first radial direction, the pin 1306 pushes the inlet cowl 1257 axially forward to extend the inlet cowl 1257 to increase the inlet length L of the engine inlet 61. The controller 1302 also controls the one or more actuators 1304 to retract the inlet cowl 1257 from the fully extended position. In particular, the one or more actuators 1304 move the pin 1306 radially along the helical tracks 1308 in a second radial direction that is opposite the first radial direction (e.g., towards the bottom side 13 of the turbine engine 1210). As the pin 1306 moves along the helical tracks 1308 in the second radial direction, the pin 1306 pulls the inlet cowl 1257 axially aftward to retract the inlet cowl 1257. In some embodiments, the pin 1306 is stationary, and the one or more actuators 1304 move the inlet cowl 1257 with respect to the pin 1306 to extend or to retract the inlet cowl 1257.

Figure 9A:
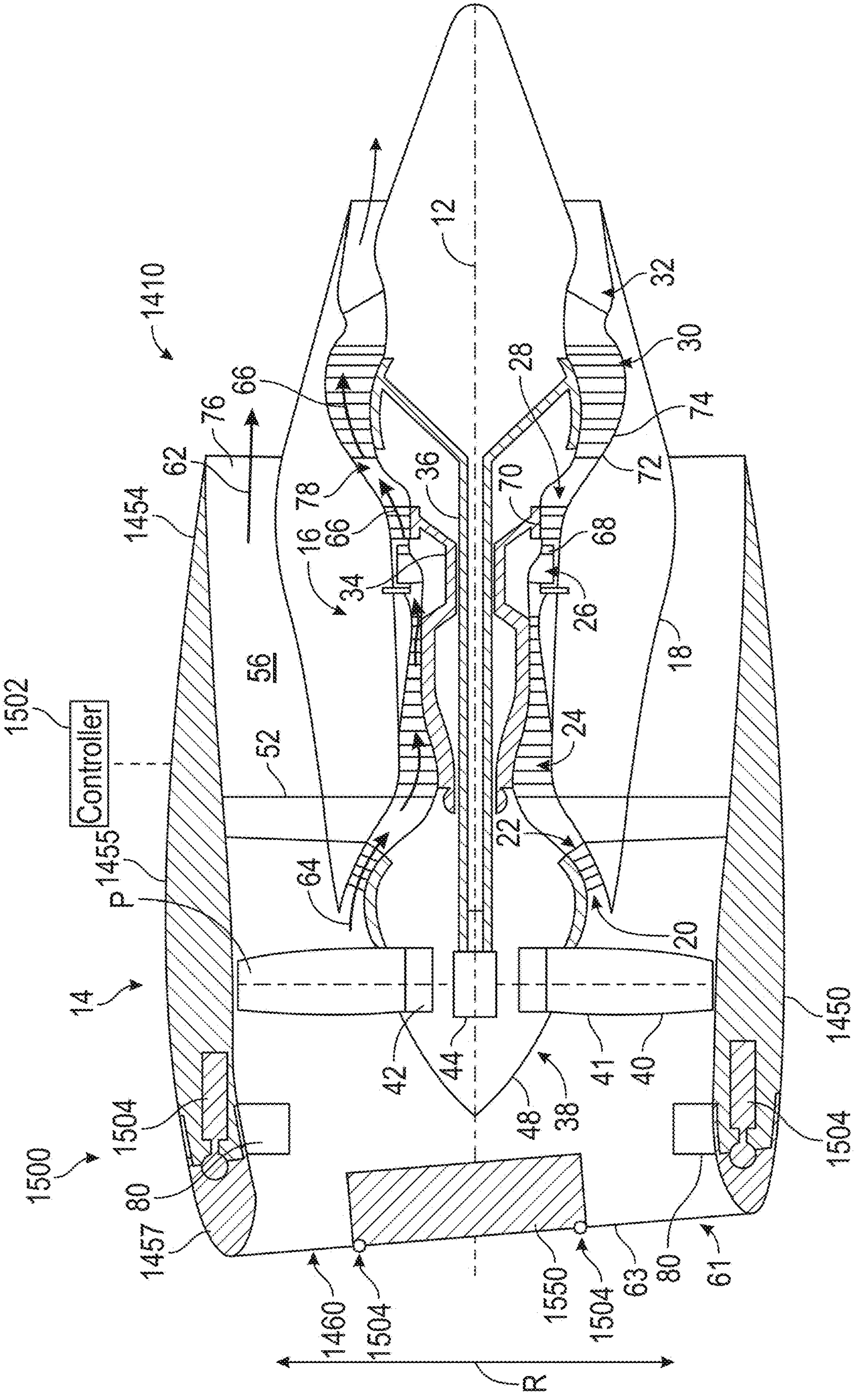
FIG. 9A is a schematic cross-sectional diagram of a turbine engine, taken along a longitudinal centerline axis of the turbine engine, with a variable engine intake system in a fully retracted position, according to another embodiment.
Figure 9B:
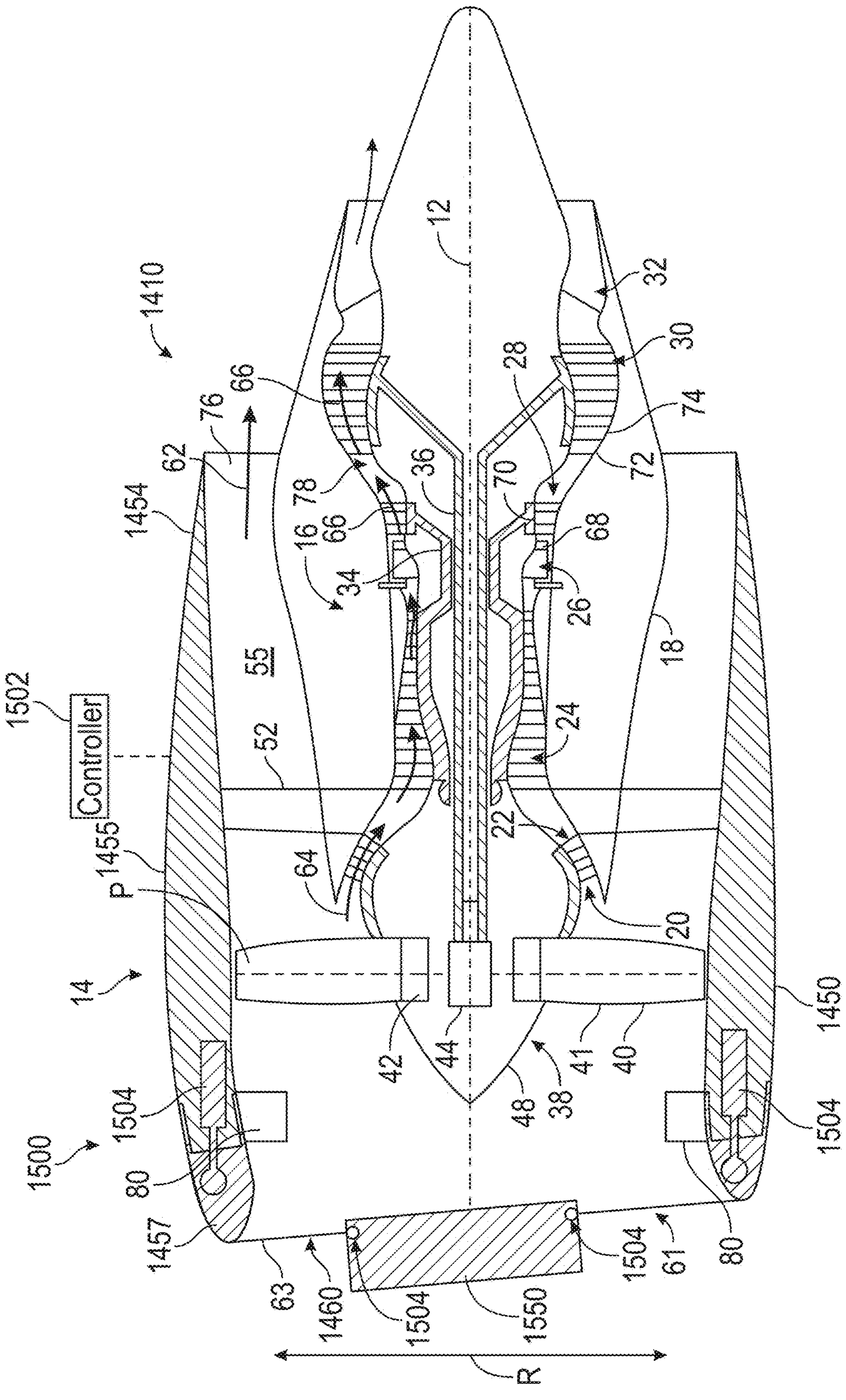
FIG. 9B is a schematic cross-sectional diagram of the turbine engine of FIG. 9A with the variable engine intake system in a fully extended position, with according to the present disclosure.

FIG. 9A is a schematic cross-sectional diagram of a turbine engine 1410, taken along the longitudinal centerline axis 12 of the turbine engine 1410 with a variable engine intake system 1500 in a fully retracted position, according to another embodiment. FIG. 9B is a schematic cross-sectional diagram of the turbine engine 1410 with the variable engine intake system 1500 in a fully extended position, according to the present disclosure. The turbine engine 1410 is substantially similar to the turbine engines 10 and 610 of FIGS. 1A to 1C and 5A to 5D, respectively. The same or similar reference numerals will be used for components of the turbine engine 1410 that are the same as or similar to the components of the turbine engine 10 discussed above, unless stated otherwise. The description of these components above also applies to this embodiment, and a detailed description of these components is omitted here.

The turbine engine 1410 includes a nacelle 1450 having a downstream section 1454, a fan cowl 1455, and an inlet cowl 1457. The turbine engine 1410 also includes an engine intake 1460 and the variable engine intake system 1500. The variable engine intake system 1500 includes a controller 1502, one or more actuators 1504, and one or more retractable doors 1550. The one or more actuators 1504 include actuators 1504 that are coupled to the inlet cowl 1457 for translating the inlet cowl 1457 forward and aftward. The one or more actuators 1504 also include actuators 1504 coupled to the one or more retractable doors 1550. The retractable doors 1550 are pivotably coupled to the nacelle 1450 by, for example, one or more hinges.

The variable engine intake system 1500 operates substantially similar to the variable engine intake system 700 of FIGS. 5A to 5D. The variable engine intake system 1500 extends and retracts the retractable doors 1550. In particular, the controller 1502 controls the one or more actuators 1504 to pivot the retractable doors 1550 axially forward to extend the retractable doors 1550 (FIG. 9B). The controller 1502 also controls the one or more actuators 1504 to pivot the retractable doors 1550 axially aftward to retract the retractable doors 1550 (FIG. 9A).

Figure 10A:
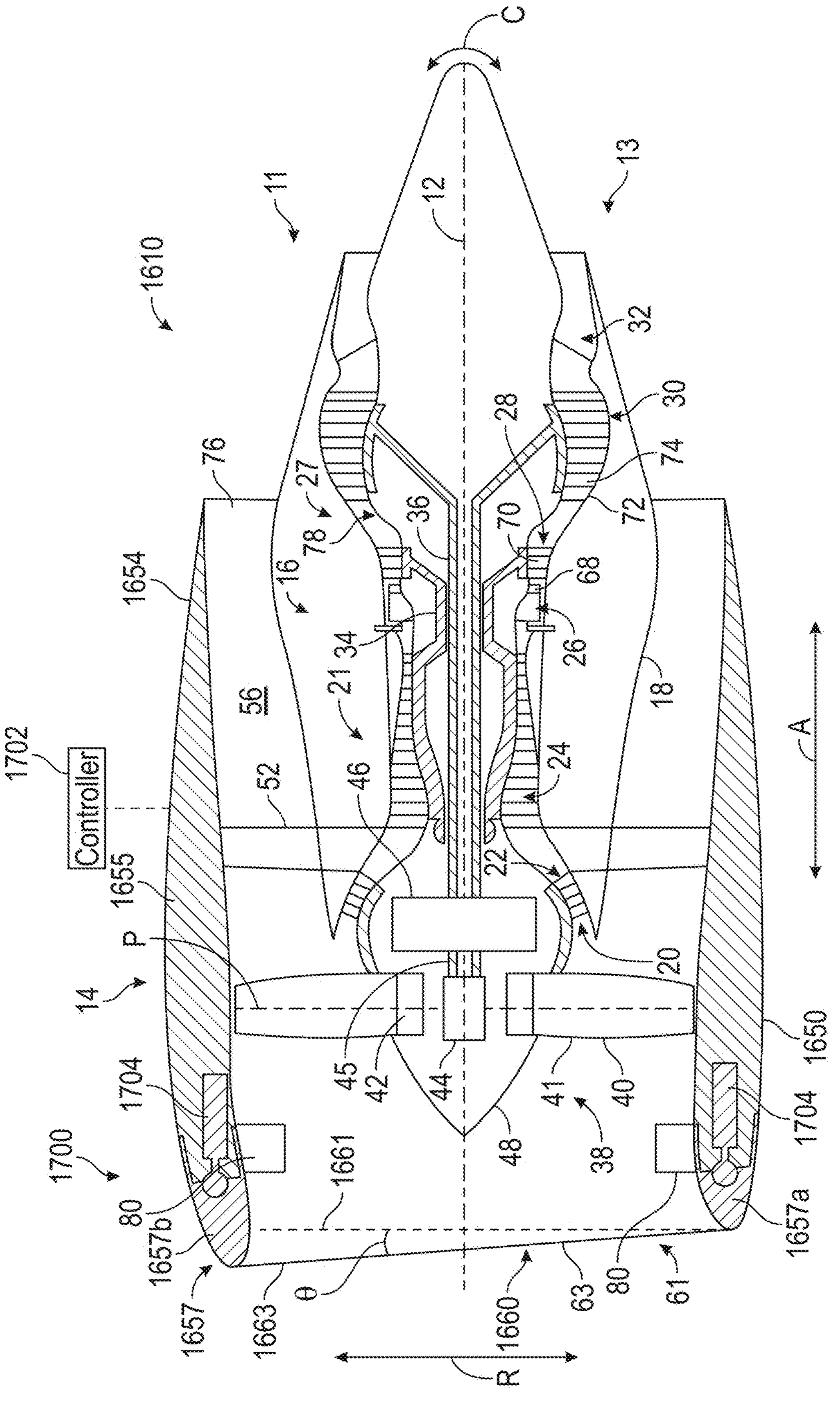
FIG. 10A is a schematic cross-sectional diagram of a turbine engine, taken along a longitudinal centerline axis of the turbine engine, with a variable engine intake system in a first droop angle position, according to another embodiment.
Figure 10B:
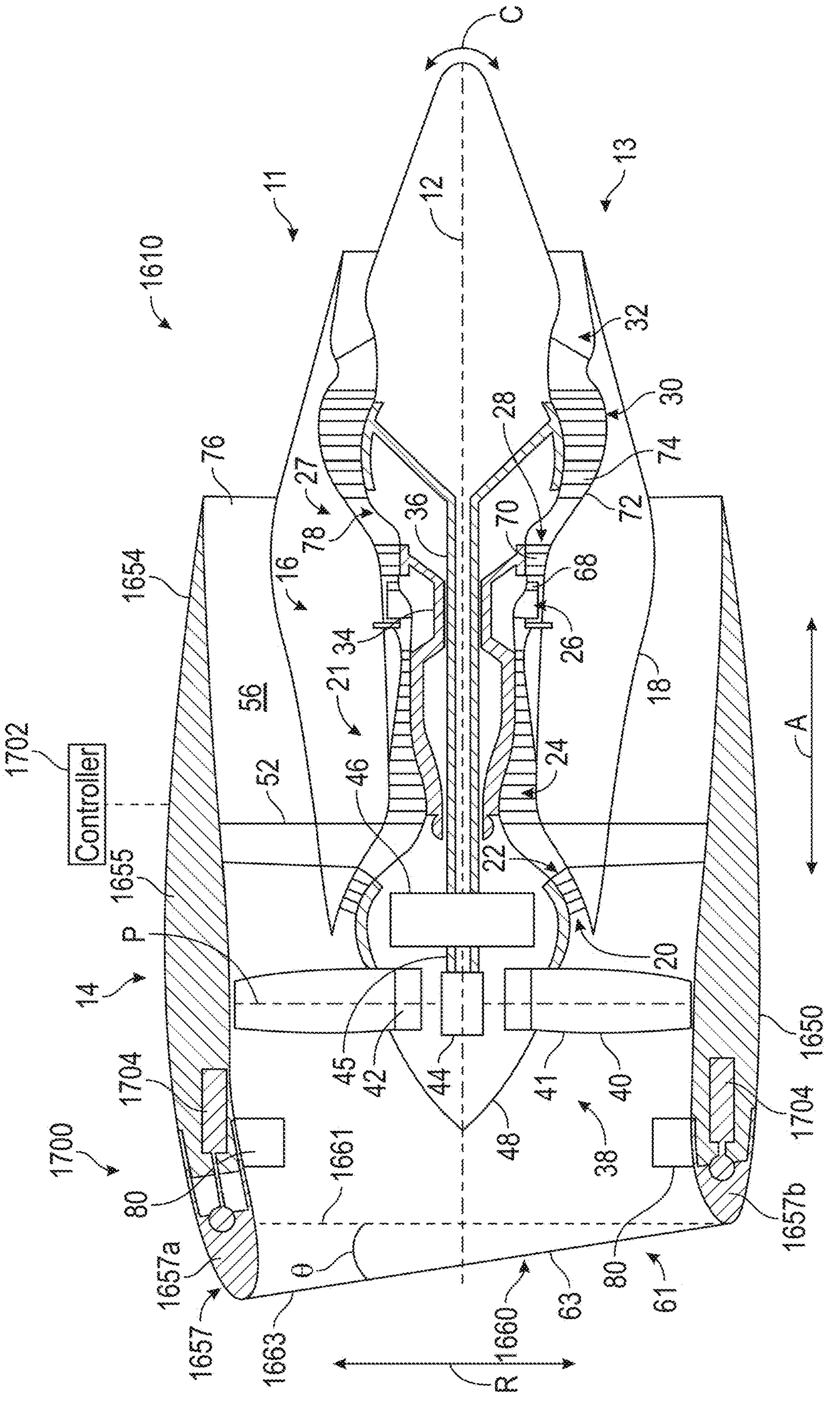
FIG. 10B is a schematic cross-sectional diagram of the turbine engine of FIG. 10A with the variable engine intake system in a second droop angle position, with according to the present disclosure.

FIG. 10A is a schematic cross-sectional diagram of a turbine engine 1610, taken along the longitudinal centerline axis 12 of the turbine engine 1610 with a variable engine intake system 1700 in a first droop angle position, according to another embodiment. FIG. 10B is a schematic cross-sectional diagram of the turbine engine 1610 with the variable engine intake system 1700 in a second droop angle position, according to the present disclosure. The turbine engine 1610 is substantially similar to the turbine engine 10 of FIGS. 1A to 1C. The same or similar reference numerals will be used for components of the turbine engine 1610 that are the same as or similar to the components of the turbine engine 10 discussed above, unless stated otherwise. The description of these components above also applies to this embodiment, and a detailed description of these components is omitted here.

The turbine engine 1610 includes a nacelle 1650 having a downstream section 1654, a fan cowl 1655, and an inlet cowl 1657. The turbine engine 1610 also includes an engine intake 1660 and the variable engine intake system 1700. The variable engine intake system 1700 includes a controller 1702 and one or more actuators 1704. The one or more actuators 1704 are coupled to the inlet cowl 1657 for translating a portion of the inlet cowl 1657 forward and aftward, as detailed further below.

The engine intake 1660 of the turbine engine 1610 has a first droop portion 1657*a* and a second droop portion 1657*b*. The first droop portion 1657*a* is at the top side 11 of the inlet cowl 1657 and the second droop portion 1657*b* is at the bottom side 13 of the inlet cowl 1657. The engine inlet 61 defines a radial plane 1661 that extends radially (e.g., parallel with the radial direction R) from the leading edge 63 of the second droop portion 1657*b*. The engine intake 1660 also defines a droop axis 1663 at the leading edge 63 of the inlet cowl 1657 that extends from leading edge 63 of the first droop portion 1657*a* to the leading edge 63 of the second droop portion 1657*b*. The first droop portion 1657*a* is tilted forward with respect to the second droop portion 1657*b* such that the inlet cowl 1657 is tilted at a droop angle θ. The droop angle θ is defined as an angle from the radial plane 1661 to the droop axis 1663. The droop angle θ is set at a nominal angle. The nominal angle is the droop angle for aircraft operation at level flight (e.g., when the angle of attack is zero). The nominal angle is typically set in fixed inlet engines as a balance between level flight and a maximum angle of attack for the turbine engine 1610. In one embodiment, the nominal angle is about 4° to about 5°. The variable engine intake system 1700 adjusts (e.g., increases or decreases) the droop angle θ, as detailed further below. For example, the variable engine intake system 1700 can adjust the droop angle θ in a range of −8° to 8° from the nominal angle.

In operation, the variable engine intake system 1700 adjusts the droop angle θ of the inlet cowl 1657 (via the one or more actuators 1704). In this way, the engine inlet 61 has a variable droop angle. In particular, the controller 1702 controls the one or more actuators 1704 to extend at least one of the first droop portion 1657*a* or the second droop portion 1657*b* to increase or to decrease the droop angle θ, respectively. For example, the controller 1702 controls the one or more actuators 1704 on the top side 11 to extend the first droop portion 1657*a* while the second droop portion 1657*b* remains stationary. In this way, the droop angle θ increases. The controller 1702 can control the one or more actuators 1704 on the top side 11 to extend and to retract the first droop portion 1657*a* to increase the droop angle θ and to decrease the droop angle θ to the nominal angle. To decrease the droop angle θ below the nominal angle, the controller 1702 controls the one or more actuators 1704 on the bottom side 13 to extend the second droop portion 1657*b* while the first droop portion 1657*a* remains stationary (e.g., in the first droop angle position). Increasing the droop angle θ tilts the inlet cowl 1657 down. Decreasing the droop angle θ tilts the inlet cowl 1657 up. The variable engine intake system 1700 can control the inlet cowl 1657 to any droop angle θ between the first droop angle position (FIG. 10A) and the second droop angle position (FIG. 10B). In some embodiments, the controller 1702 controls the one or more actuators 1704 to extend or to retract the first droop portion 1657*a* and the second droop portion 1657*b* to adjust the droop angle θ.

In one embodiment, the variable engine intake system 1700 adjusts the droop angle θ of the inlet cowl 1657 based on wind conditions (e.g., crosswind conditions or wind shear conditions), as detailed above with respect to FIGS. 1A to 4. Crosswinds or wind shear can create a similar effect as an angle of attack (AOA) by changing a trajectory of the air entering the engine intake 1660. Thus, the variable engine intake system 1700 adjusts the droop angle θ of the engine inlet 61 to mitigate the wind conditions (e.g., to minimize the air flow separation from the engine intake 1660). In particular, the variable engine intake system 1700 adjusts the droop angle θ based on the AOA of the turbine engine 1610 or the aircraft 90 on which the turbine engine 1610 is mounted. For example, the controller 1702 receives one or more AOA signals indicative of the AOA from one or more sensors and determines the AOA based on the AOA signals. The controller 1702 then adjusts the one or more actuators 1704 to adjust the droop angle θ based on the AOA. For example, the variable engine intake system 1700 increases the droop angle θ as the AOA increases, and decreases the droop angle θ as the AOA decreases. In this way, the variable engine intake system 1700 compensates for both positive and negative AOA by increasing or decreasing the droop angle θ to mitigate the wind conditions.

Figure 11B:
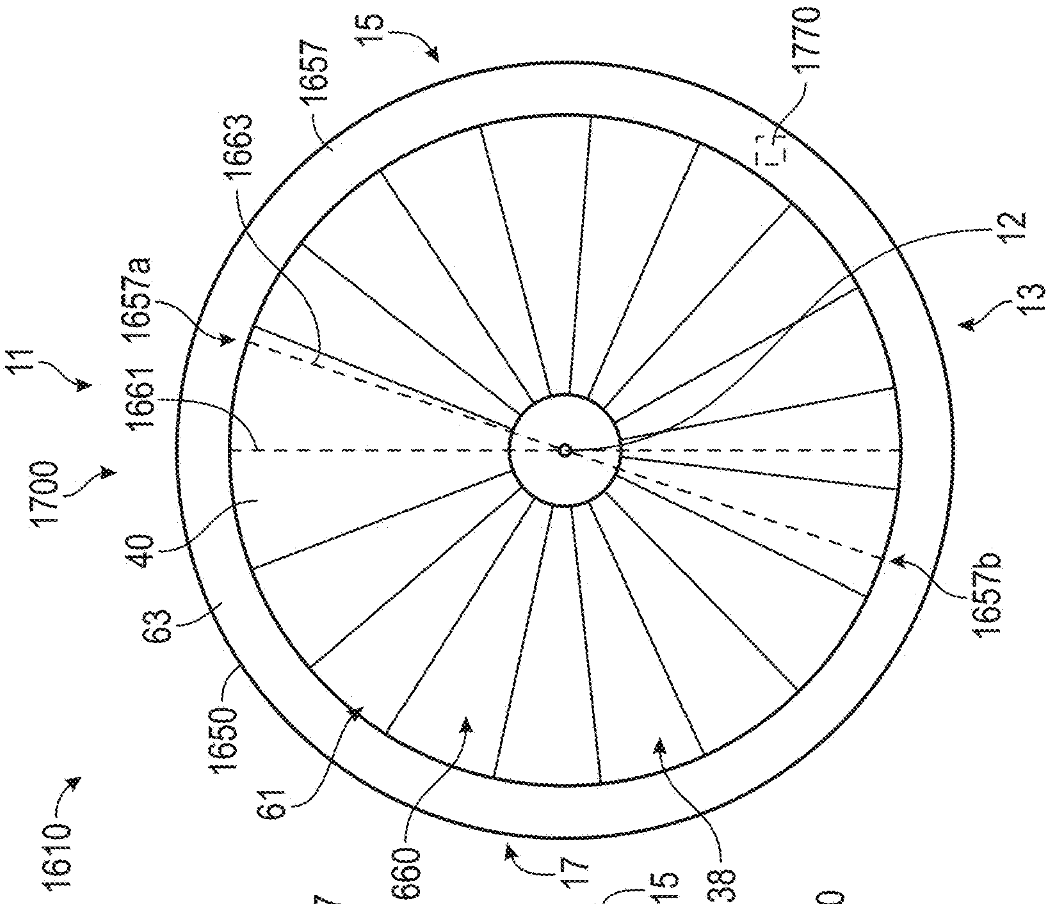
FIG. 11B is a schematic front view of the turbine engine of FIG. 10A with the variable engine intake system in a second circumferential orientation, according to the present disclosure.
Figure 11A:
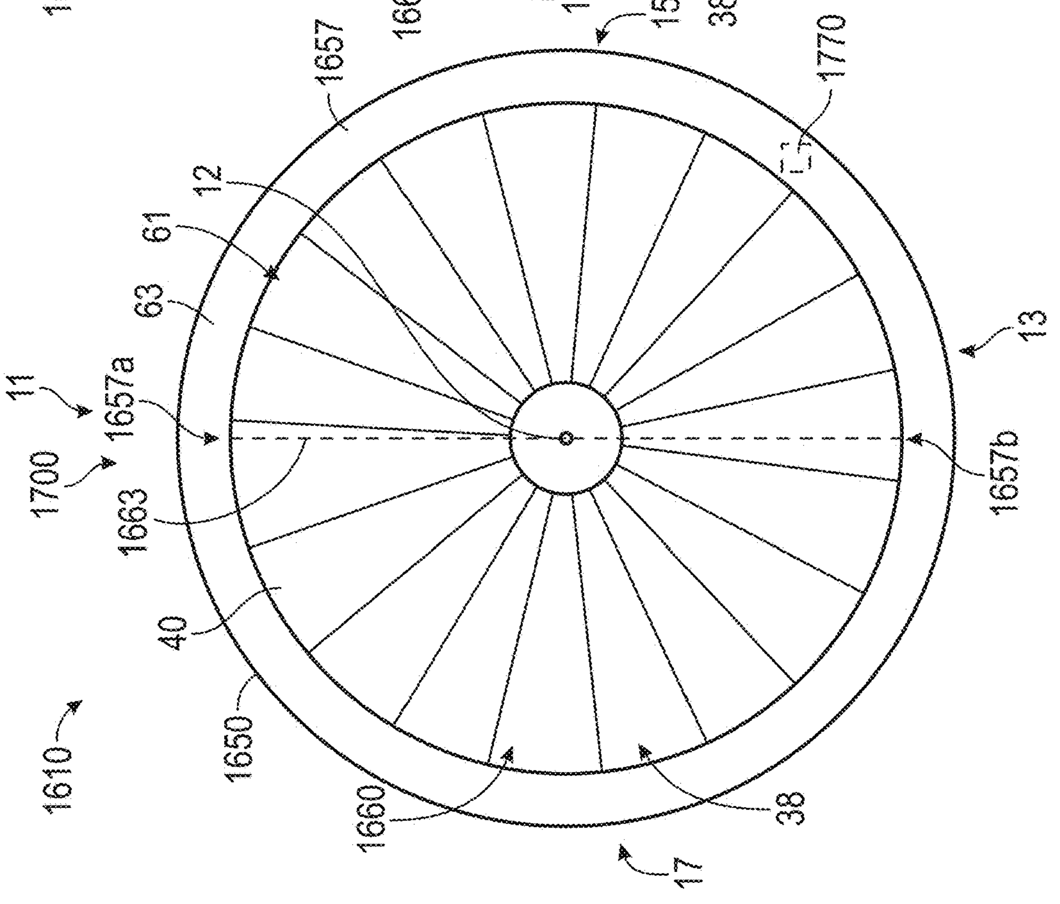
FIG. 11A is a schematic front view of the turbine engine of FIG. 10A with the variable engine intake system in a first circumferential orientation, according to the present disclosure.

FIG. 11A is a schematic front view of the turbine engine 1610 with the variable engine intake system 1700 in a first circumferential orientation, according to the present disclosure. FIG. 11B is a schematic front view of the turbine engine 1610 with the variable engine intake system 1700 in a second circumferential orientation, according to the present disclosure. As shown in FIG. 11A, the first droop portion 1657*a* is positioned at the top side 11 (e.g., about the twelve o'clock position) and the second droop portion 1657*b* is positioned at the bottom side 13 (e.g., about the six o'clock position). In particular, the droop axis 1663 extends vertically from the top side 11 to the bottom side 13.

The variable engine intake system 1700 can adjust a circumferential orientation of the droop axis 1663 to move a location of the first droop portion 1657*a* and the second droop portion 1657*b*. In particular, the variable engine intake system 1700 also includes a motor 1770 that is drivingly coupled to the inlet cowl 1657 (e.g., through a geared connection) to rotate the inlet cowl 1657 and to adjust the circumferential orientation of the droop axis 1663.

In operation, the variable engine intake system 1700 adjusts the circumferential orientation of the droop axis 1663 from the first circumferential orientation (FIG. 11A) to the second circumferential orientation (FIG. 11B). In the second circumferential orientation, the droop axis 1663 has been rotated circumferentially at a non-zero angle with respect to the radial plane 1661. In this way, the first droop portion 1657*a* and the second droop portion 1657*b* have been rotated circumferentially to be located at a different position than the top side 11 and the bottom side 13. In FIG. 11B, the variable engine intake system 1700 has rotated the droop axis 1663 clockwise such that the first droop portion 1657*a* is positioned generally at a one o'clock position and the second droop portion 1657*b* is positioned generally at a seven o'clock position.

The variable engine intake system 1700 can rotate the droop axis 1663 clockwise or counterclockwise to adjust the circumferential orientation of the droop axis 1663. For example, the variable engine intake system 1700 rotates the droop axis 1663 to any position in a range of −90° to 90° from the first circumferential orientation (FIG. 11A). In one embodiment, the variable engine intake system 1700 adjusts the circumferential orientation of the droop axis 1663 based on at least one of an air speed of the aircraft 90, the AOA, or the wind conditions (e.g., direction and velocity of the crosswind or the wind shear). In this way, the variable engine intake system 1700 can adjust the circumferential orientation of the droop axis 1663 to account for the velocity vector of the wind conditions. For example, the variable engine intake system 1700 rotates the inlet cowl 1657 to adjust the circumferential orientation of the droop axis 1663 if the wind conditions include a velocity vector between horizontal and vertical with respect to the engine inlet 61. Accordingly, the variable engine intake system 1700 rotates the droop axis 1663 to mitigate the wind conditions. Thus, the variable engine intake system 1700 adjusts both a magnitude of the droop angle θ and the circumferential orientation of the droop axis 1663. Further, changes to aircraft configuration or turbine engine configuration during a transition from ground to flight (e.g., during takeoff) could conflict with pilot command inputs. Therefore, the variable engine intake system 1700 may be locked out in flight based on a weight on wheels signal to identify the transition from ground to flight. The variable engine intake system 1700 can be unlocked when the aircraft exceeds a minimum altitude threshold (e.g., 2,000 feet).

Figure 12A:
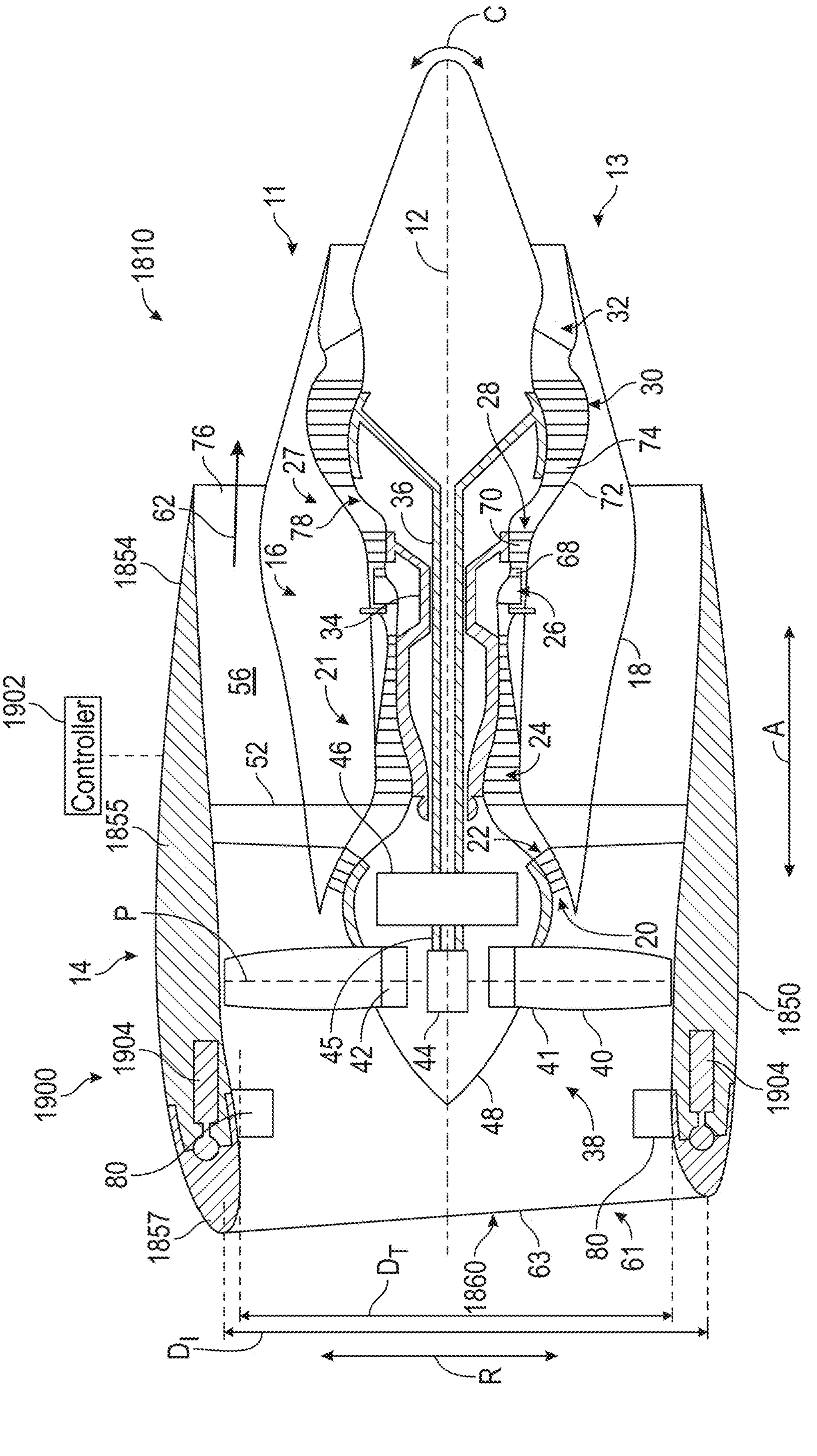
FIG. 12A is a schematic cross-sectional diagram of a turbine engine, taken along a longitudinal centerline axis of the turbine engine, with a variable engine intake system in a fully closed position, according to another embodiment.
Figure 12B:
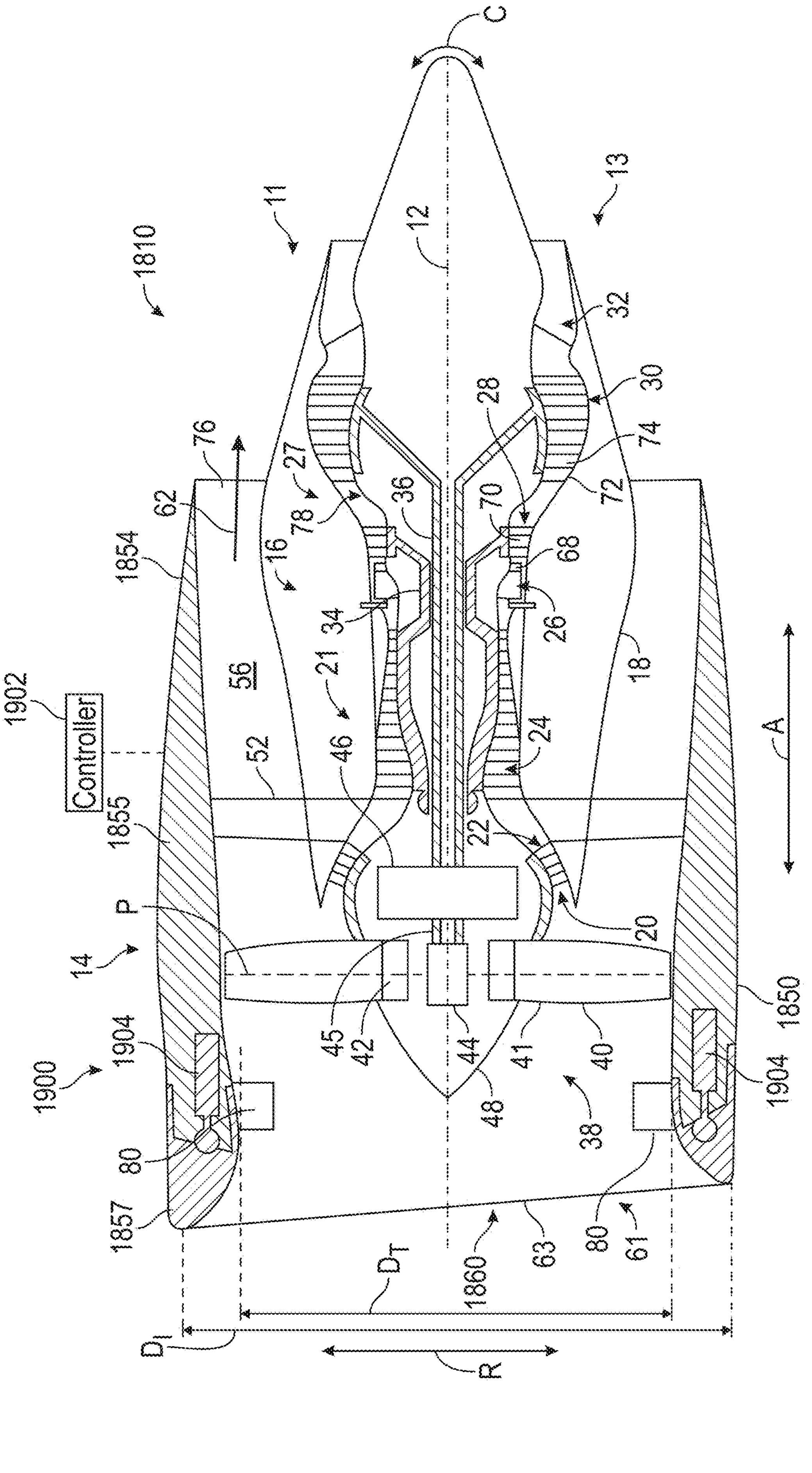
FIG. 12B is a schematic cross-sectional diagram of the turbine engine of FIG. 12A with the variable engine intake system in a fully opened position, with according to the present disclosure.
Figure 13A:
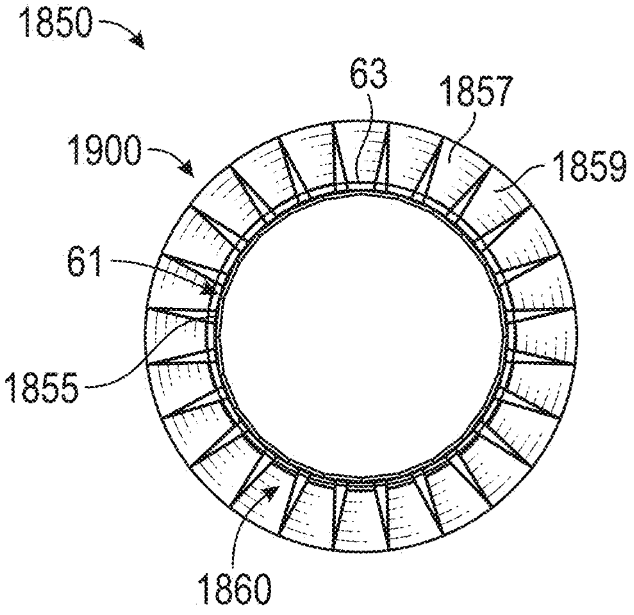
FIG. 13A is a schematic front view of a portion of a nacelle isolated from the turbine engine of FIG. 12A with the variable engine intake system in the fully closed position, according to the present disclosure.
Figure 13B:
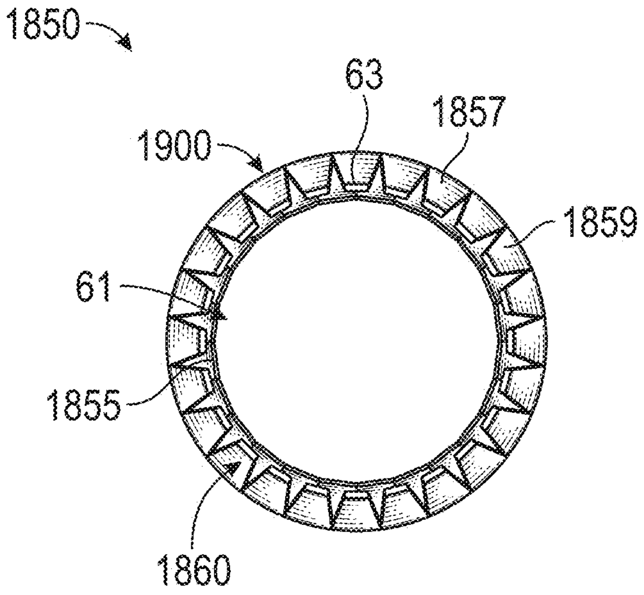
FIG. 13B is a schematic front view of the portion of the nacelle of FIG. 13A with the variable engine intake system in the fully opened position, according to the present disclosure.
Figure 14A:
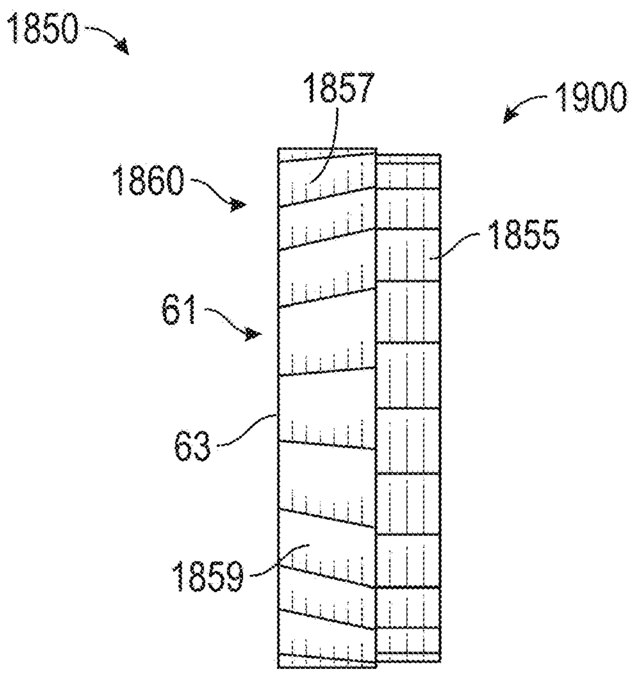
FIG. 14A is a schematic side view of a portion of a nacelle isolated from the turbine engine of FIG. 12A with the variable engine intake system in the fully closed position, according to the present disclosure.
Figure 14B:
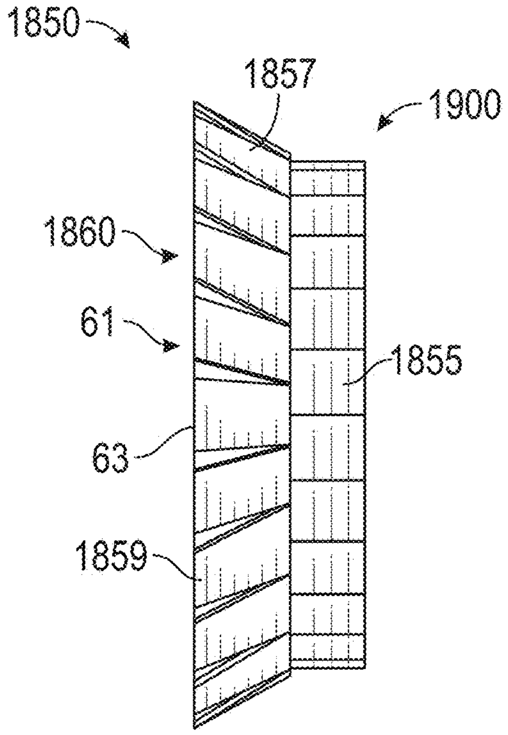
FIG. 14B is a schematic front view of the portion of the nacelle of FIG. 14A with the variable engine intake system in the fully opened position, according to the present disclosure.
Figure 15A:
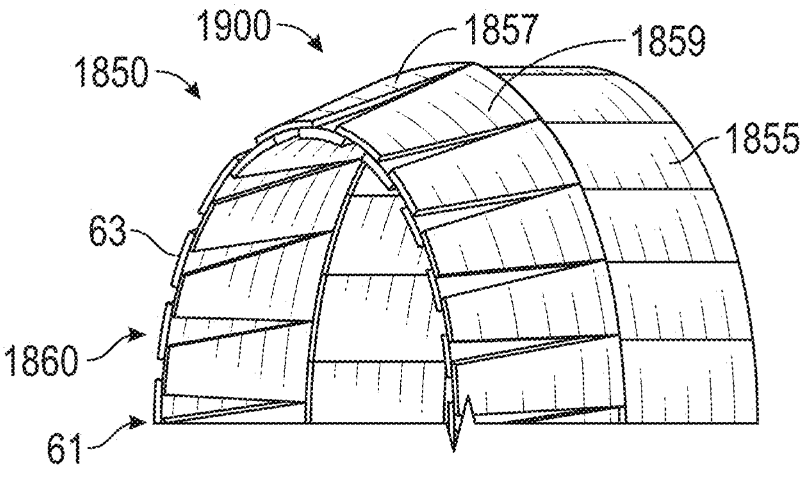
FIG. 15A is a schematic view of a portion of a nacelle isolated from the turbine engine of FIG. 12A with the variable engine intake system in the fully closed position, according to the present disclosure.
Figure 15B:
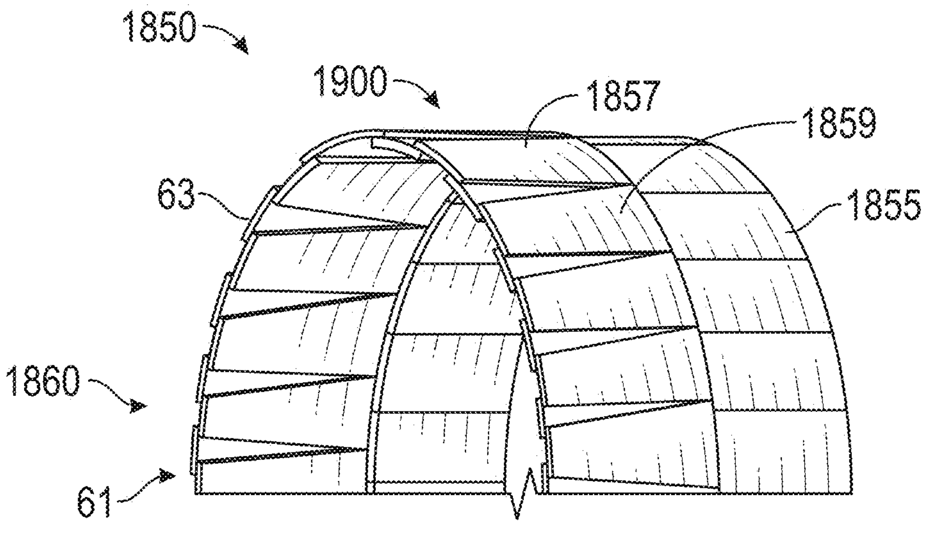
FIG. 15B is a schematic front view of the portion of the nacelle of FIG. 15A with the variable engine intake system in the fully opened position, according to the present disclosure.

FIG. 12A is a schematic cross-sectional diagram of a turbine engine 1810, taken along the longitudinal centerline axis 12 of the turbine engine 1810 with a variable engine intake system 1900 in a fully closed position, according to another embodiment. FIG. 12B is a schematic cross-sectional diagram of the turbine engine 1810 with the variable engine intake system 1900 in a fully opened position, according to the present disclosure. FIGS. 13A, 14A, and 15A illustrate a front view (FIG. 13A), a side view (FIG. 14A), and a perspective view (FIG. 15A) of a portion of a nacelle 1850 isolated from the turbine engine 1810, with the variable engine intake system 1900 in the fully closed position. FIGS. 13B, 14B, and 15B illustrate a front view (FIG. 13B), a side view (FIG. 14B), and a perspective view (FIG. 15B) of the portion of the nacelle 1850, with the variable engine intake system 1900 in the fully opened position.

The turbine engine 1810 is substantially similar to the turbine engine 10 of FIGS. 1A to 1C. The same or similar reference numerals will be used for components of the turbine engine 1810 that are the same as or similar to the components of the turbine engine 10 discussed above, unless stated otherwise. The description of these components above also applies to this embodiment, and a detailed description of these components is omitted here.

The turbine engine 1810 includes the nacelle 1850 having a downstream section 1854, a fan cowl 1855, and an inlet cowl 1857. The inlet cowl 1857 overlaps with the fan cowl 1855. As shown in FIGS. 13A to 15B, the inlet cowl 1857 includes a plurality of flaps 1859 that expands circumferentially as a diameter of the inlet cowl 1857 increases, as detailed further below. Each of the flaps 1859 overlaps adjacent flaps 1859 such that the plurality of flaps 1859 form a continuous ring that defines the inlet 1857. The turbine engine 1810 also includes an engine intake 1860 and the variable engine intake system 1900. The variable engine intake system 1900 includes a controller 1902 and one or more actuators 1904. The one or more actuators 1904 are coupled to the inlet cowl 1857 for adjusting a diameter of the inlet cowl 1857 outwards and inwards, as detailed further below.

The engine intake 1860 (e.g., the engine inlet 61) of the turbine engine 1810 has a throat diameter $D_T$. The throat diameter $D_T$ is a diameter of the engine inlet 61 at a location of the smallest interior diameter of the engine inlet 61 forward of the fan 38. The engine intake 1860 (e.g., the engine inlet 61) also has an inlet tip diameter $D_I$ that is defined as a diameter of the engine inlet 61 at a forwardmost leading edge of the inlet cowl 1857. The throat diameter $D_T$ is less than the inlet tip diameter $D_I$. The engine intake 1860 (e.g., the engine inlet 61) includes a contraction ratio CR that is defined as a ratio of the inlet tip diameter $D_I$ to the throat diameter $D_T$.

In operation, the variable engine intake system 1900 adjusts (e.g., increases or decreases) the inlet tip diameter $D_I$ of the engine inlet 61 to open (FIGS. 12A, 13A, 14A, 15A) or to close (FIGS. 12B, 13B, 14B, 15B) the engine intake 1860. In particular, the controller 1902 controls the one or more actuators 1904 to open or to close the inlet cowl 1857 of the engine intake 1860. To open the inlet cowl 1857, the one or more actuators 1904 push the plurality of flaps 1859 outward and forward to increase the diameter and the circumference of the inlet cowl 1857. Thus, the inlet tip diameter $D_I$ increases when the inlet cowl 1857 is opened. The variable engine intake system 1900 can adjust the inlet tip diameter $D_I$ while the throat diameter remains constant. In this way, the inlet cowl 1857 forms a bell mouth shape when the inlet tip diameter $D_I$ is increased. To close the inlet cowl 1857, the one or more actuators 1904 pull the plurality of flaps 1859 inward and aftward to decrease the diameter and the circumference of the inlet cowl 1857. Thus, the inlet tip diameter $D_I$ decreases when the inlet cowl 1857 is closed. In some embodiments, the variable engine intake system 1900 adjusts the throat diameter $D_T$ to increase or to decrease the throat diameter $D_T$.

The inlet tip diameter $D_I$ is at a minimum when the inlet cowl 1857 is in the fully closed position (FIGS. 12A, 13A, 14A, and 15A). The inlet tip diameter is at a maximum when the inlet cowl 1857 is in the fully opened positioned (FIGS. 12B, 13B, 14B, and 15B). The variable engine intake system 1900 can open and can close the inlet cowl 1857 to any position between the fully closed position and the fully opened position. A ratio of the maximum inlet tip diameter $D_I$ (fully opened position) to the minimum inlet tip diameter $D_I$ (fully closed position) ($D_{Imax}/D_{Imin}$) is in a range of 1.02 to 1.25. Further, the contraction ratio CR increases as the inlet tip diameter $D_I$ increases, and decreases as the inlet tip diameter $D_I$ decreases. Increasing the contraction ratio CR helps to mitigate the wind conditions.

In some embodiments, the variable engine intake system 1900 opens or closes the inlet cowl 1857 based on wind conditions (e.g., crosswind conditions or wind shear conditions), as detailed above with respect to FIGS. 1A to 4. In this way, the variable engine intake system 1900 opens or closes the engine inlet 61 of the engine intake 1860 (e.g., by opening or closing the inlet cowl 1857) to mitigate the wind conditions (e.g., to minimize air flow separation in the engine intake 1860 to prevent stall). In some embodiments, the variable engine intake system 1900 opens or closes the inlet cowl 1857 at low aircraft speeds (e.g., speeds less than the maximum speed at which a rejected takeoff can be initiated). Opening the inlet cowl 1857 enables increased thrust at the low aircraft speeds as compared to turbine engines without the benefit of the present disclosure.

Accordingly, the variable engine intake systems detailed herein provide an improved system for mitigating wind conditions about the turbine engine while also allowing for a shorter engine inlet to reduce drag during normal operation, as compared to turbine engines without the benefit of the present disclosure. In particular, the variable engine intake system can adjust at least one of the pitch of the fan blades, the pitch of inlet guide vanes, the length of the engine intake, the droop angle of the engine intake, or the diameter of the engine intake. Such features can be used together, or may be mutually exclusive. For example, the variable engine intake system can adjust combinations of the pitch of the fan blades, the pitch of inlet guide vanes, the length of the engine intake, the droop angle of the engine intake, or the diameter of the engine intake. Further, the wind condition sensors provide input of the wind conditions (e.g., crosswind conditions or wind shear conditions) occur without needing to wait for the aircraft position or trajectory to change as a result of the wind conditions.

Further aspects are provided by the subject matter of the following clauses.

A turbine engine comprising a fan having a plurality of fan blades, a turbo-engine positioned downstream of the fan and having a core inlet, an engine intake that extends to the core inlet, wherein air enters the turbine engine through the engine intake, and a variable engine intake system. The variable engine intake system comprises a plurality of wind condition sensors for sensing wind conditions about the turbine engine, the plurality of wind condition sensors including one or more first wind condition sensors on a first side of the turbine engine and one or more second wind condition sensors on a second side of the turbine engine, and a controller that adjusts the engine intake based on the wind conditions about the turbine engine from the one or more first wind condition sensors and the one or more second wind condition sensors.

The turbine engine of the preceding clause, wherein the one or more first wind condition sensors include one or more first crosswind sensors positioned on a first horizontal side of the turbine engine, and the one or more second wind condition sensors include one or more second crosswind sensors positioned on a second horizontal side of the turbine engine.

The turbine engine of any preceding clause, wherein the one or more first wind condition sensors include one or more first wind shear sensors positioned on a top side of the turbine engine, and the one or more second wind condition sensors include one or more second wind shear sensors positioned on a bottom of the turbine engine.

The turbine engine of any preceding clause, wherein the controller adjusts the engine intake based further on a ground proximity of the turbine engine.

The turbine engine of any preceding clause, wherein the controller adjusts at least one of a pitch of the plurality of fan blades, a pitch of one or more inlet guide vanes of the turbine engine, an axial length of an engine inlet of the turbine engine, a droop angle of the engine inlet, or a diameter of the engine inlet.

The turbine engine of any preceding clause, wherein the engine intake includes an engine inlet that includes an inlet length and an inlet diameter, the inlet length being defined as an axial length from a leading edge of the plurality of fan blades at a fan hub of the fan to a leading edge of the turbine engine, the inlet diameter being defined as a diameter of the fan at a tip of the plurality of fan blades, and a ratio of the inlet length to the inlet diameter is in a range of 0.3 to 1.

The turbine engine of any preceding clause, wherein the controller receives one or more wind condition sensor signals from the one or more first wind condition sensors and the one or more second wind condition sensors, and adjusts the engine intake if the one or more wind condition sensor signals from the one or more first wind condition sensors and the one or more second wind condition sensors are different.

The turbine engine of the preceding clause, wherein the controller sets the engine intake at a nominal configuration if the one or more wind condition sensor signals from the one or more first wind condition sensors and the one or more second wind condition sensors are substantially equal.

The turbine engine of any preceding clause, wherein the controller receives one or more first wind condition sensor signals from the one or more first wind condition sensors, and receives one or more second wind condition sensor signals from the one or more second wind condition sensors.

The turbine engine of the preceding clause, wherein the controller adjusts the engine intake if the one or more first wind condition sensor signals are different than the one or more second wind condition sensor signals.

A method of operating the turbine engine of any preceding clause. The method comprises adjusting the engine intake based on the wind conditions about the turbine engine from the one or more first wind condition sensors and the one or more second wind condition sensors.

The method of the preceding clause, wherein the one or more first wind condition sensors include one or more first crosswind sensors that sense crosswind conditions and are positioned on a first horizontal side of the turbine engine, the one or more second wind condition sensors include one or more second crosswind sensors that sense the crosswind conditions and are positioned on a second horizontal side of the turbine engine, and the method further comprises adjusting the engine intake based on the crosswind conditions from the one or more first crosswind sensors and the one or more second crosswind sensors.

The method of any preceding clause, wherein the one or more first wind condition sensors include one or more first wind shear sensors that sense wind shear conditions and are positioned on a top side of the turbine engine, and the one or more second wind condition sensors include one or more second wind shear sensors that sense wind shear conditions and are positioned on a bottom of the turbine engine, and the method further comprises adjusting the engine intake based on the wind shear conditions from the one or more first wind shear sensors and the one or more second wind shear sensors.

The method of any preceding clause, further comprising adjusting the engine intake based further on a ground proximity of the turbine engine.

The method of any preceding clause, wherein adjusting the engine intake includes adjusting at least one of a pitch of the plurality of fan blades, a pitch of one or more inlet guide vanes of the turbine engine, an axial length of an engine inlet of the turbine engine, a droop angle of the engine inlet, or a diameter of the engine inlet.

The method of any preceding clause, wherein the engine intake includes an engine inlet that includes an inlet length and an inlet diameter, the inlet length being defined as an axial length from a leading edge of the plurality of fan blades at a fan hub of the fan to a leading edge of the turbine engine, the inlet diameter being defined as a diameter of the fan at a tip of the plurality of fan blades, and a ratio of the inlet length to the inlet diameter is in a range of 0.3 to 1.

The method of any preceding clause, further comprising receiving one or more wind condition sensor signals from the one or more first wind condition sensors and the one or more second wind condition sensors, and adjusting the engine intake if the one or more wind condition sensor signals from the one or more first wind condition sensors and the one or more second wind condition sensors are different.

The method of the preceding clause, further comprising setting the engine intake at a nominal configuration if the one or more wind condition sensor signals from the one or more first wind condition sensors and the one or more second wind condition sensors are substantially equal.

The method of any preceding clause, further comprising receiving one or more first wind condition sensor signals from the one or more first wind condition sensors, and receiving one or more second wind condition sensor signals from the one or more second wind condition sensors.

The method of the preceding clause, further comprising adjusting the engine intake if the one or more first wind condition sensor signals are different than the one or more second wind condition sensor signals.

A turbine engine comprising a fan having a plurality of fan blades, a nacelle that extends circumferentially about the fan, the nacelle including a fan cowl and an inlet cowl that is movable with respect to the fan cowl, an engine intake including an engine inlet defined from a leading edge of the nacelle to the plurality of fan blades, and a variable engine intake system that adjusts the inlet cowl axially between a fully retracted position and a fully extended position to adjust an inlet length of the engine inlet, wherein the inlet cowl maintains contact with the fan cowl when the inlet cowl is extended.

The turbine engine of the preceding clause, wherein the turbine engine includes a heating system disposed through the inlet cowl that heats the inlet cowl.

The turbine engine of any preceding clause, wherein the variable engine intake system includes one or more actuators and a controller that controls the one or more actuators to adjust the inlet cowl.

The turbine engine of any preceding clause, wherein the variable engine intake system adjusts the inlet cowl based on wind conditions about the turbine engine including at least one of crosswind conditions or wind shear conditions.

The turbine engine of any preceding clause, wherein the variable engine intake system includes one or more actuators that each includes a rod that is coupled to the inlet cowl, and the one or more actuators extend and retract the rod to adjust the inlet cowl.

The turbine engine of any preceding clause, wherein the variable engine intake system includes one or more actuators that each includes a pin disposed within one or more helical tracks, and the one or more actuators move at least one of the pin along the one or more helical tracks or the inlet cowl about the pin to adjust the inlet cowl axially between the fully retracted position and the fully retracted position.

The turbine engine of any preceding clause, wherein the inlet length is defined axially from a leading edge of the plurality of fan blades at a fan hub of the fan to a leading edge of the nacelle, the engine inlet having an inlet diameter defined as a diameter of the fan at a tip of the plurality of fan blades, and a ratio of the inlet length to the inlet diameter is in a range of 0.2 to 1.0.

The turbine engine of the preceding clause, wherein the inlet length includes a maximum inlet length in the fully extended position and a minimum inlet length in the fully retracted position, and a ratio of the maximum inlet length to the minimum inlet length is in a range of 1.1 to 2.0.

The turbine engine of any preceding clause, wherein the inlet cowl includes one or more extension portions that extend aftward from the inlet cowl and over the fan cowl.

The turbine engine of the preceding clause, wherein the one or more extension portions are tapered from the inlet cowl to the fan cowl such that there is a smooth transition from the one or more extension portions to the fan cowl.

A method of operating the turbine engine of any preceding clause, the method comprising adjusting the inlet cowl axially between a fully closed position and a fully opened position to adjust an inlet length of the engine inlet, wherein the inlet cowl maintains contact with the fan cowl when the inlet cowl is extended.

The method of the preceding clause, wherein the turbine engine includes a heating system disposed through the inlet cowl, and the method further comprises heating the inlet cowl.

The method of any preceding clause, wherein the variable engine intake system includes one or more actuators coupled to the inlet cowl, and the method further comprises adjusting the one or more actuators to adjust the inlet cowl.

The method of any preceding clause, further comprising adjusting the inlet cowl based on wind conditions about the turbine engine, the wind conditions including at least one of crosswind conditions or wind shear conditions.

The method of any preceding clause, wherein the variable engine intake system includes one or more actuators that each includes a rod that is coupled to the inlet cowl, and the method further comprises extending and retracting the rod to adjust the inlet cowl.

The method of any preceding clause, wherein the variable engine intake system includes one or more actuators that each includes a pin disposed within one or more helical tracks, and the method further comprises moving at least one of the pin along the one or more helical tracks or the inlet cowl about the pin to adjust the inlet cowl axially between the fully retracted position and the fully extended position.

The method of any preceding clause, wherein the inlet length is defined axially from a leading edge of the plurality of fan blades at a fan hub of the fan to a leading edge of the nacelle, the engine inlet having an inlet diameter defined as a diameter of the fan at a tip of the plurality of fan blades, and a ratio of the inlet length to the inlet diameter is in a range of 0.2 to 1.0.

The method of the preceding clause, wherein the inlet length includes a maximum inlet length in the fully extended position and a minimum inlet length in the fully retracted position, and a ratio of the maximum inlet length to the minimum inlet length is in a range of 1.1 to 2.0.

The method of any preceding clause, wherein the inlet cowl includes one or more extension portions that extend aftward from the inlet cowl and over the fan cowl.

The method of the preceding clause, wherein the one or more extension portions are tapered from the inlet cowl to the fan cowl such that there is a smooth transition from the one or more extension portions to the fan cowl.

A turbine engine comprising a fan having a plurality of fan blades, a nacelle that extends circumferentially about the fan, the nacelle including a fan cowl and an inlet cowl that is movable with respect to the fan cowl, an engine intake including an engine inlet defined from a leading edge of the inlet cowl to the plurality of fan blades, the engine inlet defining a droop axis at the leading edge of the inlet cowl, the inlet cowl being tilted at a droop angle that is defined as an angle of the droop axis with respect to an axial plane of the turbine engine, and a variable engine intake system that adjusts the droop angle of the inlet cowl during operation of the turbine engine.

The turbine engine of any preceding clause, wherein the turbine engine includes a heating system disposed through the inlet cowl that heats the inlet cowl.

The turbine engine of any preceding clause, wherein the variable engine intake system includes one or more actuators and a controller that controls the one or more actuators to adjust the droop angle of the inlet cowl.

The turbine engine of any preceding clause, wherein the variable engine intake system adjusts the droop angle of the inlet cowl based on wind conditions about the turbine engine, the wind conditions including at least one of crosswind conditions or wind shear conditions.

The turbine engine of any preceding clause, wherein the variable engine intake system adjusts the droop angle of the inlet cowl based on an angle of attack of the turbine engine.

The turbine engine of any preceding clause, wherein the droop angle is positioned at a nominal angle, and the variable engine intake system adjusts the droop angle in a range of −8° to 8° from the nominal angle.

The turbine engine of any preceding clause, wherein the inlet cowl includes a first droop portion and a second droop portion, and, to adjust the droop angle, the variable engine intake system adjusts at least one of the first droop portion or the second droop portion.

The turbine engine of the preceding clause, wherein the variable engine intake system adjusts a circumferential orientation of the droop axis to move a circumferential location of the first droop portion and the second droop portion.

The turbine engine of any preceding clause, further comprising a motor that is drivingly coupled to the inlet cowl, the motor rotating the inlet cowl to adjust the circumferential orientation of the droop axis.

The turbine engine of any preceding clause, wherein the turbine engine defines a radial direction, and the variable engine intake system adjusts the circumferential orientation of the droop axis in a range of −90° to 90° from the radial direction.

A method of operating the turbine engine of any preceding clause, the method comprising adjusting the droop angle of the inlet cowl during operation of the turbine engine.

The method of the preceding clause, wherein the turbine engine includes a heating system disposed through the inlet cowl, and the method further comprises heating the inlet cowl with the heating system.

The method of any preceding clause, wherein the variable engine intake system includes one or more actuators, and the method further comprises controlling the one or more actuators to adjust the droop angle of the inlet cowl.

The method of any preceding clause, further comprising adjusting the droop angle of the inlet cowl based on wind conditions about the turbine engine, the wind conditions including at least one of crosswind conditions or wind shear conditions.

The method of any preceding clause, further comprising adjusting the droop angle of the inlet cowl based on an angle of attack of the turbine engine.

The method of any preceding clause, wherein the droop angle is positioned at a nominal angle, and the method further comprises adjusting the droop angle in a range of −8° to 8° from the nominal angle.

The method of any preceding clause, wherein the inlet cowl includes a first droop portion and a second droop portion, and the method further comprises, to adjust the droop angle, adjusting at least one of the first droop portion or the second droop portion.

The method of the preceding clause, further comprising adjusting a circumferential orientation of the droop axis to move a circumferential location of the first droop portion and the second droop portion.

The method of the preceding clause, further comprising rotating the inlet cowl to adjust the circumferential orientation of the droop axis.

The method of any preceding clause, wherein the turbine engine defines a radial direction, and the method further comprises adjusting the circumferential orientation of the droop axis in a range of −90° to 90° from the radial direction.

A turbine engine comprising a fan having a plurality of fan blades, a nacelle that extends circumferentially about the fan, the nacelle including a fan cowl and an inlet cowl that is movable with respect to the fan cowl, an engine intake including an engine inlet defined from a leading edge of the inlet cowl to the plurality of fan blades, the engine inlet having an inlet tip diameter at the leading edge of the inlet cowl, and a variable engine intake system that adjusts the inlet cowl to adjust the inlet tip diameter of the engine inlet.

The turbine engine of the preceding clause, wherein the engine inlet has a throat diameter defined at a smallest diameter of the engine inlet, the throat diameter remaining constant as the variable engine intake system adjusts the inlet tip diameter.

The turbine engine of any preceding clause, wherein the turbine engine includes a heating system disposed through the inlet cowl that heats the inlet cowl.

The turbine engine of any preceding clause, wherein the variable engine intake system includes one or more actuators coupled to the inlet cowl and a controller that controls the one or more actuators to adjust the inlet tip diameter of the engine inlet.

The turbine engine of any preceding clause, wherein the variable engine intake system adjusts the inlet tip diameter based on wind conditions about the turbine engine, the wind conditions including at least one of crosswind conditions or wind shear conditions.

The turbine engine of any preceding clause, wherein the inlet cowl overlaps the fan cowl, and the inlet cowl moves forward when the variable engine intake system increases the inlet tip diameter.

The turbine engine of the preceding clause, wherein the inlet cowl moves aftward when the variable engine intake system decreases the inlet tip diameter.

The turbine engine of any preceding clause, wherein the variable engine intake system adjusts the inlet cowl between a fully opened positioned and a fully closed position.

The turbine engine of the preceding clause, wherein the inlet tip diameter is at a minimum inlet tip diameter in the fully closed positioned, and the inlet tip diameter is at a maximum inlet tip diameter at the fully opened positioned.

The turbine engine of the preceding clause, wherein a ratio of the maximum inlet tip diameter to the minimum inlet tip diameter is in a range of 1.02 to 1.25.

A method of operating the turbine engine of any preceding clause, the method comprising adjusting the inlet cowl to adjust the inlet tip diameter of the engine inlet.

The method of the preceding clause, wherein the engine inlet has a throat diameter defined at a smallest diameter of the engine inlet, and the method further comprises adjusting the inlet cowl to adjust the inlet tip diameter while the throat diameter remains constant.

The method of any preceding clause, wherein the turbine engine includes a heating system disposed through the inlet cowl, and the method further comprises heating the inlet cowl with the heating system.

The method of any preceding clause, wherein the variable engine intake system includes one or more actuators coupled to the inlet cowl, and the method further comprises adjusting the one or more actuators to adjust the inlet tip diameter of the engine inlet.

The method of any preceding clause, further comprising adjusting the inlet tip diameter based on wind conditions about the turbine engine including at least one of crosswind conditions or wind shear conditions.

The method of any preceding clause, wherein the inlet cowl overlaps the fan cowl, and the method further comprises moving the inlet cowl forward when the variable engine intake system increases the inlet tip diameter.

The method of the preceding clause, further comprising moving the inlet cowl aftward when the variable engine intake system decreases the inlet tip diameter.

The method of any preceding clause, further comprising adjusting the inlet cowl between a fully opened positioned and a fully closed position.

The method of the preceding clause, wherein the inlet tip diameter is at a minimum inlet tip diameter in the fully closed positioned, and the inlet tip diameter is at a maximum inlet tip diameter at the fully opened positioned.

The method of any preceding clause, wherein a ratio of the maximum inlet tip diameter to the minimum inlet tip diameter is in a range of 1.02 to 1.25.

Although the foregoing description is directed to the preferred embodiments of the present disclosure, other variations and modifications will be apparent to those skilled in the art and may be made without departing from the disclosure. Moreover, features described in connection with one embodiment of the present disclosure may be used in conjunction with other embodiments, even if not explicitly stated above.

The invention claimed is:

1. A method of operating a turbine engine including a fan, a nacelle that extends circumferentially about the fan and having a fan cowl and an inlet cowl, the method comprising:

adjusting the inlet cowl axially between a fully retracted position and a fully extended position to adjust an inlet length of the turbine engine; and maintaining contact of the inlet cowl with a radially outermost surface and a radially innermost surface of the fan cowl when the inlet cowl is extended.

2. The method of claim 1, further comprising heating the inlet cowl with a heating system.

3. The method of claim 1, further comprising adjusting one or more actuators to adjust the inlet cowl.

4. The method of claim 1, further comprising adjusting the inlet cowl based on wind conditions about the turbine engine, the wind conditions including at least one of crosswind conditions or wind shear conditions.

5. The method of claim 1, further comprising extending and retracting a rod coupled to the inlet cowl to adjust the inlet cowl.

6. The method of claim 1, further comprising moving at least one of a pin along one or more helical tracks or the inlet cowl about the pin to adjust the inlet cowl axially between the fully retracted position and the fully extended position.

7. The method of claim 1, wherein the inlet length is defined axially from a leading edge of a plurality of fan blades at a fan hub of the fan to a leading edge of the nacelle, the turbine engine having an inlet diameter defined as a diameter of the fan at a tip of the plurality of fan blades, and adjusting the inlet cowl axially comprises adjusting a ratio of the inlet length to the inlet diameter within a range of from 0.2 to 1.0.

8. The method of claim 7, wherein the inlet length includes a maximum inlet length in the fully extended position and a minimum inlet length in the fully retracted position, and adjusting the inlet cowl axially comprises adjusting a ratio of the maximum inlet length to the minimum inlet length within a range of from 1.1 to 2.0.

9. The method of claim 1, wherein maintaining contact with the radially outermost surface and the radially innermost surface of the inlet cowl with the fan cowl includes maintaining contact of one or more extension portions that extend aft from the inlet cowl with the fan cowl.

10. The method of claim 9, further comprising maintaining a form fit of the inlet cowl with the fan cowl when the inlet cowl is extended with a taper of the one or more extension portions that extends from the inlet cowl to the fan cowl.

11. The method of claim 2, further comprising supplying a heating fluid from a heating fluid source through a heating fluid line to a heating element to heat the inlet cowl.

12. The method of claim 11, further comprising supplying bleed air from a compressor of the turbine engine as the heating fluid.

13. The method of claim 2, further comprising supplying electricity from an electrical source via an electrical line to a heating element to heat the inlet cowl.

14. A method of operating a turbine engine including a fan, a nacelle that extends circumferentially about the fan and having a fan cowl and an inlet cowl, the method comprising:

adjusting one or more actuators to extend and retract a rod coupled to the inlet cowl to adjust the inlet cowl axially between a fully retracted position and a fully extended position to adjust an inlet length of the turbine engine; and maintaining contact of the inlet cowl with a radially outermost surface and a radially innermost surface of the fan cowl when the inlet cowl is extended.

15. The method of claim 14, further comprising heating the inlet cowl with a heating system.

16. The method of claim 14, further comprising adjusting the inlet cowl based on wind conditions about the turbine engine, the wind conditions including at least one of cross-wind conditions or wind shear conditions.

17. The method of claim 14, further comprising moving at least one of a pin along one or more helical tracks or the inlet cowl about the pin to adjust the inlet cowl axially between the fully retracted position and the fully extended position.

18. The method of claim 14, wherein the inlet length is defined axially from a leading edge of a plurality of fan blades at a fan hub of the fan to a leading edge of the nacelle, the turbine engine having an inlet diameter defined as a diameter of the fan at a tip of the plurality of fan blades, and adjusting the inlet cowl axially comprises adjusting a ratio of the inlet length to the inlet diameter within a range of from 0.2 to 1.0.

19. The method of claim 18, wherein the inlet length includes a maximum inlet length in the fully extended position and a minimum inlet length in the fully retracted position, and adjusting the inlet cowl axially comprises adjusting a ratio of the maximum inlet length to the minimum inlet length within a range of from 1.1 to 2.0.

20. The method of claim 14, wherein maintaining contact with the radially outermost surface and the radially innermost surface of the inlet cowl with the fan cowl includes maintaining contact of one or more extension portions that extend aft from the inlet cowl with the fan cowl.

* * * * *